United States Patent [19]
Meyerhoefer et al.

[11] Patent Number: 6,018,452
[45] Date of Patent: Jan. 25, 2000

[54] RESIDENTIAL PROTECTION SERVICE CENTER

[75] Inventors: Carl H. Meyerhoefer, Dix Hills; Nisar A. Chaudhry, West Babylon; Thomas J. Smith, Bayshore, all of N.Y.

[73] Assignee: TII Industries, Inc., Copiague, N.Y.

[21] Appl. No.: 09/052,233

[22] Filed: Mar. 31, 1998

Related U.S. Application Data

[63] Continuation-in-part of application No. 08/868,351, Jun. 3, 1997, Pat. No. 5,844,764.
[51] Int. Cl.$^7$ ........................................................ H02H 3/22
[52] U.S. Cl. ............................................. 361/111; 361/119
[58] Field of Search ............................... 361/56, 111, 117, 361/118, 119; 379/156, 399, 324–326, 330–332

[56] References Cited

U.S. PATENT DOCUMENTS

| | | | |
|---|---|---|---|
| 4,023,071 | 5/1977 | Fussell | 361/56 |
| 4,168,514 | 9/1979 | Howell | 361/56 |
| 4,438,477 | 3/1984 | Cawley | 361/119 |
| 4,616,155 | 10/1986 | Guichard | 313/573 |
| 4,677,518 | 6/1987 | Hershfield | 361/56 |
| 4,807,083 | 2/1989 | Austin | 361/111 |
| 4,979,209 | 12/1990 | Collins et al. | 379/399 |
| 5,394,466 | 2/1995 | Schneider et al. | 379/399 |
| 5,412,526 | 5/1995 | Kapp | 361/56 |
| 5,553,136 | 9/1996 | Meyerhoefer et al. | 379/399 |
| 5,566,056 | 10/1996 | Chaudhry | 361/117 |
| 5,625,521 | 4/1997 | Luu | 361/111 |
| 5,675,468 | 10/1997 | Chang | 361/119 |

FOREIGN PATENT DOCUMENTS

| | | | |
|---|---|---|---|
| 0 165 347 | 12/1985 | European Pat. Off. | H02H 9/04 |
| 0 286 739 | 10/1988 | European Pat. Off. | H02H 9/04 |
| 0 353 166 | 1/1990 | European Pat. Off. | H02H 9/04 |
| 0 840 413 | 5/1998 | European Pat. Off. | H01T 4/08 |
| 38 31 935 | 3/1990 | Germany | H01T 4/08 |
| WO 90/03058 | 3/1990 | WIPO | H02H 9/06 |
| WO 91/16752 | 10/1991 | WIPO | H02H 9/04 |

OTHER PUBLICATIONS

International Search Report PCT/US/98/09821 mailed Aug. 26, 1998.
Trinkwald J: "Schaumende Ausloser" Elektrische Energie Technik, vol. 35, No. 1 Feb. 1990, pp. 32 and 34. Figures 1 and 2 disclose overvoltage protection circuits using MOVs.
Cabling for the workplace '96, pp. 769–800.
Gapped arresters revisited: A Solution to Cascade Coordination, Mansoor et al, IEEE, Preprint (1997).
Lucent Technologies Brochure re HomeStar® Wiring System (1996).
Erico, Inc. Press Relase re EPDCHP (Aug. 24, 1997).

*Primary Examiner*—Ronald W. Leja
*Attorney, Agent, or Firm*—Morgan & Finnegan

[57] ABSTRACT

Residential protection service center apparatus comprising AC power line overvoltage protection, telephone voice line overvoltage and overcurrent protection, high speed data line overvoltage and overcurrent protection and coaxial transmission line overvoltage protection, all tied to a common ground.

28 Claims, 24 Drawing Sheets

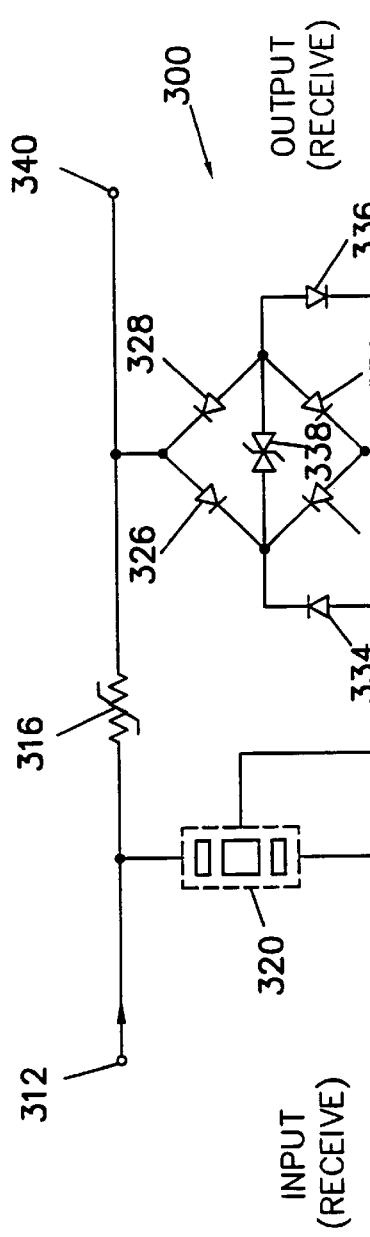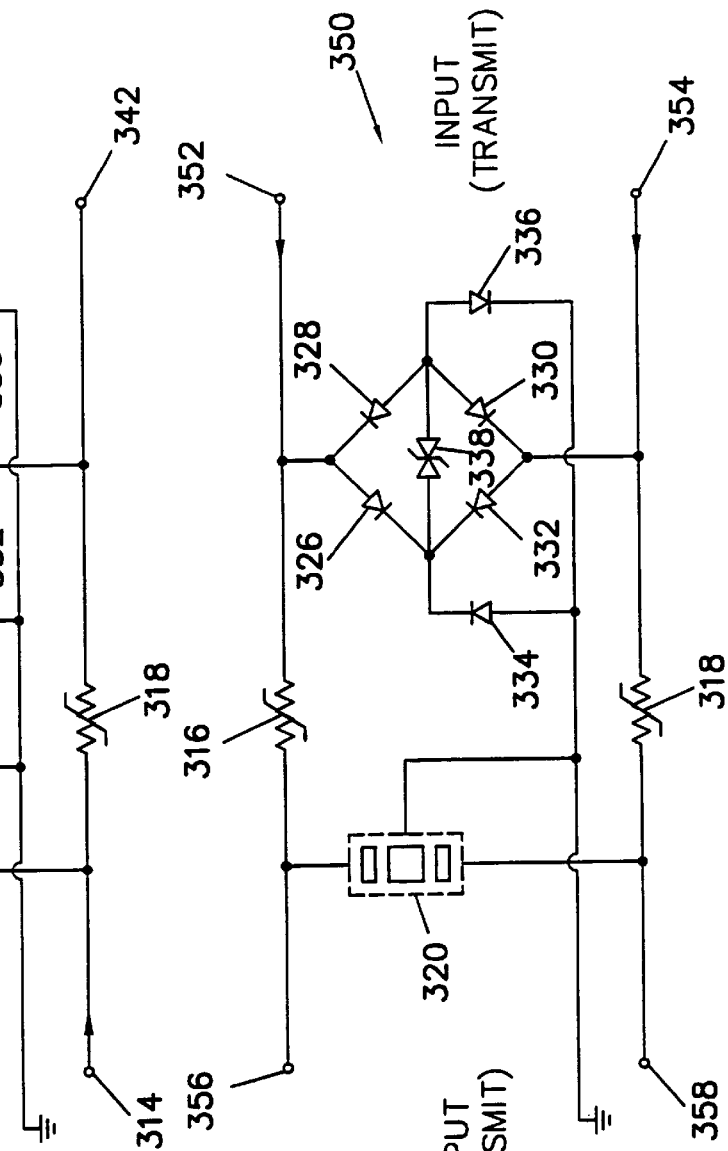
FIG. 16A
FIG. 16B

RESIDENTIAL PROTECTION SERVICE CENTER

RELATED APPLICATIONS

This application is a continuation-in-part of Ser. No. 08/868,351 filed Jun. 3, 1997 now U.S. Pat. No. 5,844,764.

BACKGROUND OF THE INVENTION

1. Field of the Invention

The present invention relates to apparatus for protecting AC power lines, telephone lines and coaxial transmission lines and, more particularly, to apparatus which provides protection for those lines using a common ground.

2. Discussion of the Related Art

Today many homes use sensitive electronic equipment as telecommuting and conducting business from one's home have become more commonplace. In addition to home entertainment centers with expensive audio/visual equipment, many homes now have personal computers, modems, printers, copiers, facsimile machines, telephone answering systems and home security systems. This sensitive electronic equipment is connected to the outside world by means of telephone lines (both voice lines and high speed data lines), coaxial transmission lines (both cable TV and satellite dish antennas) and AC power lines.

Standards have been developed for residential cabling known as the EIA/TIA 570 standard and the Consumer Electronics Bus (CEBus®). These standards deal with Category 3 and Category 5 unshielded twisted pair cabling and coaxial cabling. These standards are described in "Cabling The Workplace '96" at pages 769 through 800.

Companies have recently begun offering complete home wiring systems which comply with the CEBus® standard. One example is the HomeStar® Wiring System offered by Lucent Technologies. According to Lucent Technologies literature, the HomeStar® System "[i]ntegrates a wide range of telecommunications and home automation technologies—from interactive home entertainment and personal communications to security and environmental management systems." The HomeStar® System does not, however, provide overvoltage protection for the different types of wires (RG6 coaxial cabling, Category 3 and Category 5 unshielded twisted pair cabling) used in the system.

Lightning is a major source of overvoltage conditions on residential wiring. The overvoltage condition can result from a direct lightning strike or it can be induced in the AC transmission lines by a nearby lightning strike. It is estimated that there are over 90 million lightning bolts striking the United States annually, of course, only a small percentage strike buildings. However, each year thousands of homes and businesses are damaged or destroyed by lightning strikes. In 1990 residential claims for lightning damage exceeded one billion dollars. This number will increase as homeowners purchase more sophisticated electronics equipment.

Overvoltage conditions can also result from power line crosses caused, for example, by a vehicle striking a utility pole. Transients (voltage spikes) are caused by the utility company when it switches capacitor banks on and off line in order to correct the power factor (VI cosΘ). Transients can also originate within the home when inductive loads such as electric motors are switched. Transients can also result from switching non-inductive loads and can be induced on wiring in the home.

Primary overvoltage protection for telephone lines is provided by surge arrestors located in network interface devices mounted on the outside of the home. See devices 73 in FIG. 3 of U.S. Pat. No. 4,979,209 issued to Collins et al on Dec. 19, 1990. Grounding for these overvoltage protection devices is provided by means of an earth ground brought into the enclosure at the time of installation and attached to ground bus 71 at terminal 71A.

Coaxial transmission lines carrying cable television signals may also be brought into a home through network interface devices mounted on the outside of the home. See U.S. Pat. No. 5,394,466 issued to Schneider et al on Feb. 28, 1995. As shown in FIG. 1 of that patent, the coaxial cable is grounded by connecting a ground strap 228 from module 220 to ground bus 71 which is then connected to earth ground. See column 4, lines 50–54. Coaxial surge arrestors for protecting coaxial transmission lines from overvoltage conditions are also known. See U.S. Pat. No. 4,616,155 issued to Guichard on Oct. 7, 1986 and U.S. Pat. No. 5,566,056 issued to Chaudhry on Oct. 15, 1996.

Many homeowners attempt to protect their valuable electronic equipment with plug-in surge suppressors. Such devices do not protect equipment from the large amplitude pulses caused by lightning strikes, although they do offer some protection against low energy transients originating within the home. Moreover, plug-in surge suppressors are generally located far from the earth ground where the electric utilities are brought into the building. A surge suppressor is only as good as the ground to which it is connected. A plug-in surge suppressor which protects both AC power lines and telephone lines is shown in U.S. Pat. No. 4,438,477 issued to Cawley on Mar. 20, 1984.

SUMMARY OF THE INVENTION

The present invention provides an integrated residential protection service center having overvoltage protection for AC power lines, overvoltage and overcurrent protection for telephone voice lines, overvoltage and overcurrent protection for high speed data lines and overvoltage protection for coaxial transmission lines. The residential protection center, which may also include an AC power meter, ties all of the protective devices to a common ground. The result is a protection system that is more efficient in its use of protective devices and more effective in that the protective devices are all tied to a common ground. Plug-in overvoltage protection devices may also be utilized in combination with the residential protection service center.

The subject matter which we regard as our invention is more particularly pointed out in the claims at the end of the specification. The invention, including its method of operation and its numerous advantages, may best be understood by reference to the following description taken in connection with the accompanying drawings wherein like reference numerals refer to like components.

DESCRIPTION OF THE DRAWINGS

FIG. 16A is a schematic diagram of a high speed data line overvoltage/overcurrent protection circuit for use with the present invention;

FIG. 16B is a schematic diagram of another high speed data line overvoltage/overcurrent protection circuit for use with the present invention;

DESCRIPTION OF THE PREFERRED EMBODIMENTS

Figure 1:
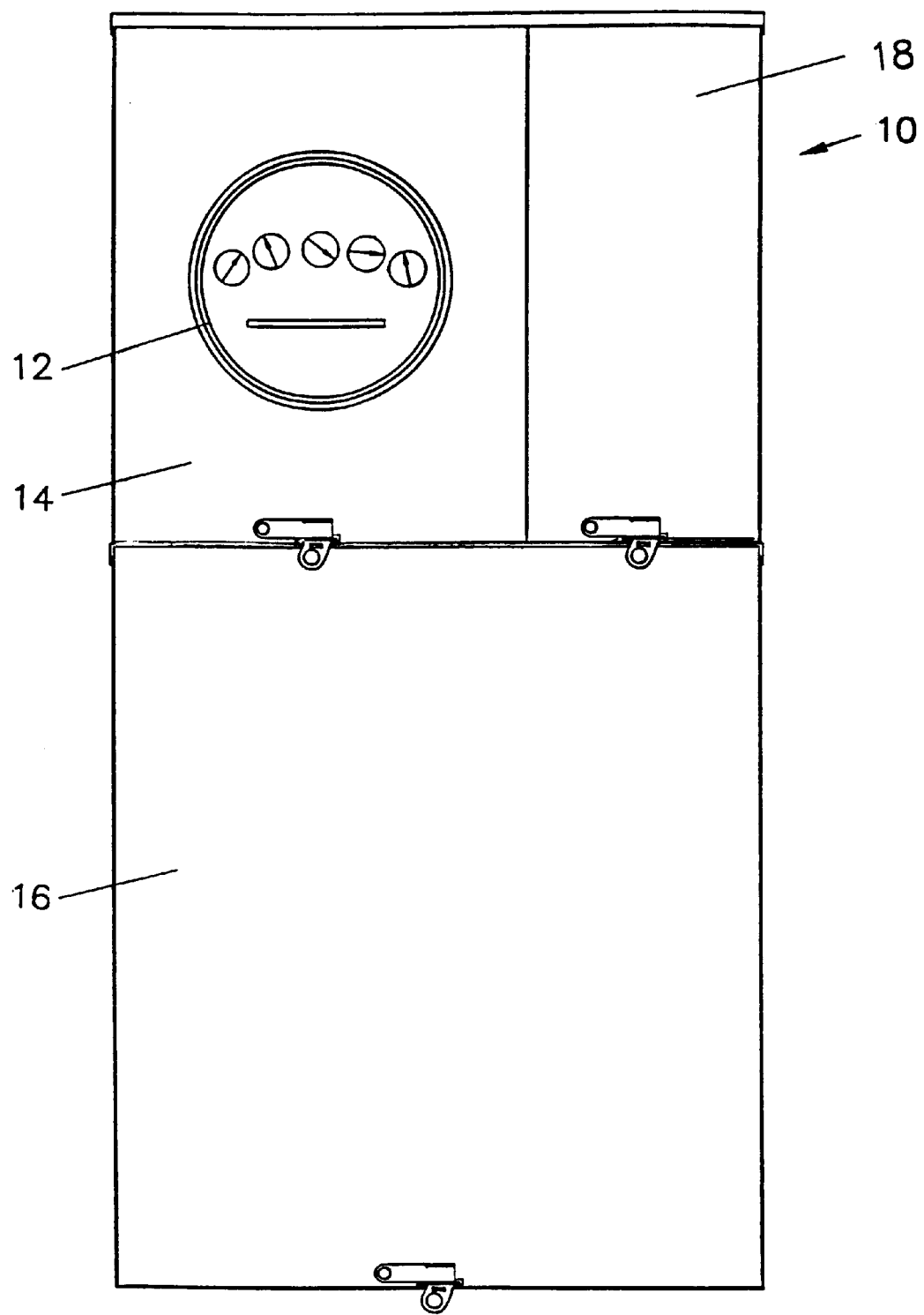
FIG. 1 is a plan view of an externally-mounted residential protection service center according to a first embodiment of the present invention with the access covers in the closed position.

FIG. 1 shows an externally-mounted residential protection service center in accordance with one embodiment of the present invention. It comprises an enclosure 10 having an AC power meter 12. The enclosure has a customer access cover 18, a utility company access cover 14 and a cover 16 that is shared by the customer and utilities.

Figure 2:
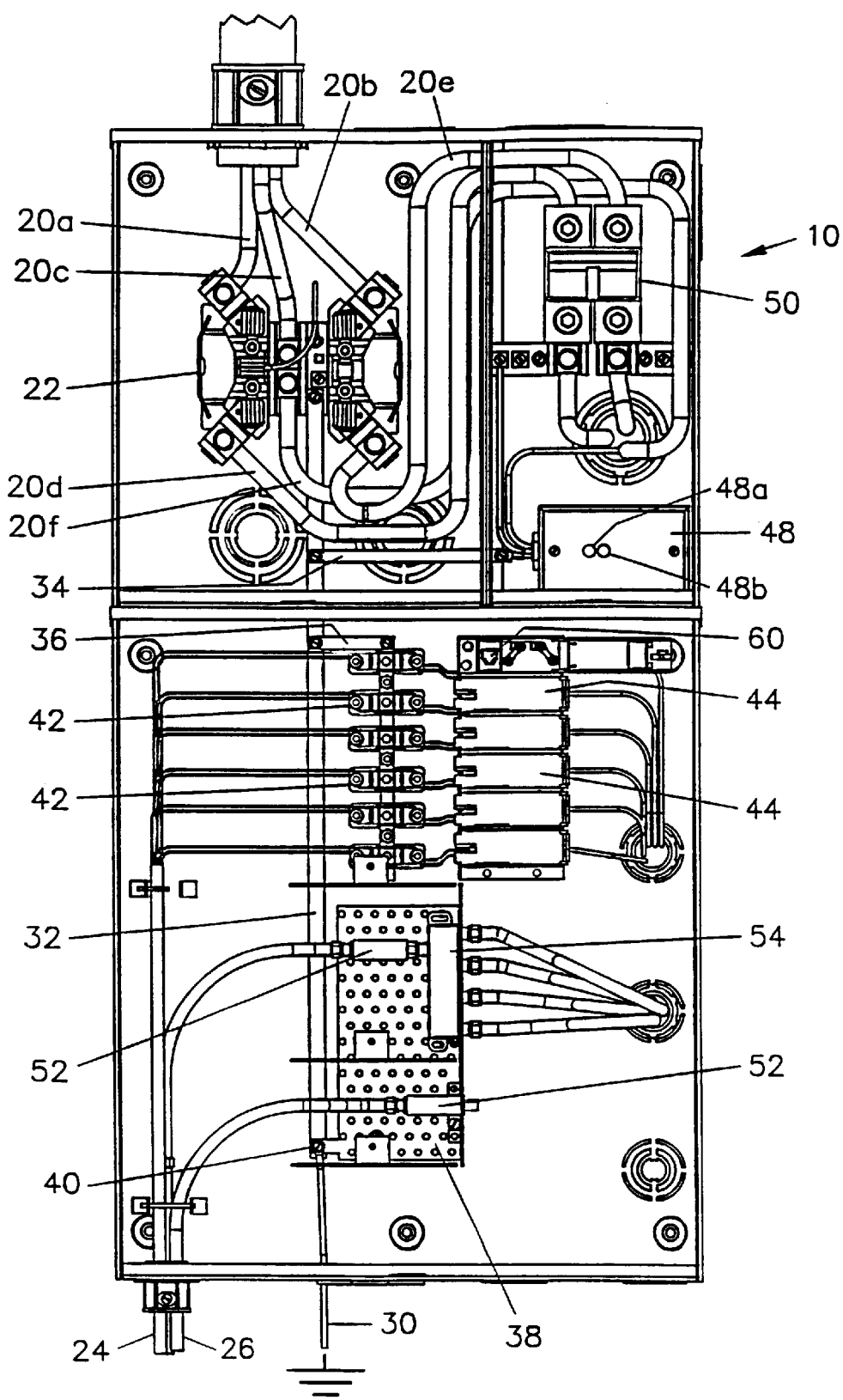
FIG. 2 is a plan view of the residential protection service center of FIG. 1 with the access covers removed.

FIG. 2 shows the residential protection service center of FIG. 1 with the utility company and customer access covers removed. The enclosure 10 receives a cable containing AC power lines 20a and 20b and neutral 20c which are connected to the input side of AC power meter pan base 22. Also connected to the AC power meter pan base 22 is a ground conductor 32 which functions as a common ground. Neutral wires 20c and 20f are connected to ground conductor 32. At the time of installation an earth ground 30 is brought into the enclosure and connected to ground conductor 32 by a suitable electrical connector 40. Wires 20d and 20e connect the output side of AC power meter pan base 22 to the input side of customer ON/OFF switch 50 which allows the customer to shut off power to the residence. The output side of switch 50 is connected to the customer's electrical distribution network through a circuit breaker panel or fuse box.

Enclosure 10 may also contain an AC overvoltage protector 48 for protecting the AC power lines from overvoltage conditions. Overvoltage protector 48 is connected to the residential side of meter 12 and to ground conductor 32 by a ground conductor 34. AC overvoltage protector 48 may, for example, be a Model EMC 240A or a Model EMC 240B surge suppressor made by TII Industries, Inc., Copiague, N.Y. The AC overvoltage protector 48 may contain LED indicators 48a, 48b which provide an indication when protection has failed for each of the AC lines.

In addition to AC power lines, enclosure 10 also receives cable 24 containing telephone company ("telco") lines carrying voice and/or data signals. The telco lines are connected to overvoltage protection devices 42 (which may also include overcurrent protection) which protect the telco lines. A suitable overvoltage protection device is the Model No. MSP 350 made by TII Industries, Inc., Copiague, N.Y. A suitable overvoltage and overcurrent protection device is the Model No. 356M3 also made by TII Industries. The telco lines are also connected to customer bridge modules 44 which interconnect the telco and customer lines. The customer bridge modules 44 preferably contain an RJ-11 type jack 60 which provides a point of demarcation between the telco and customer lines as explained more fully later. The overvoltage protection devices 42 are connected to a ground conductor 36 which is connected to the common ground 32.

Enclosure 10 also receives a coaxial transmission line 26 which may carry video signals from a cable television company or a satellite dish antenna. The coaxial transmission line is connected to a coaxial connector 52 which preferably includes a coaxial surge arrestor which may, for example, be a Model E210 made by TII Industries, Inc., Copiague, N.Y. The coaxial surge arrestor is described in greater detail later. The coaxial connector is mounted on a ground conductor 38 which may take the form of a ground plate as shown in FIG. 2. Coax ground conductor 38 is connected to ground conductor 32 at the point 40 where earth ground 30 is connected to ground conductor 32. Also mounted on ground conductor 38 is a coax splitter 54 which splits the incoming coaxial transmission line into four outgoing coaxial transmission lines. Coax splitter 54 may include an amplifier to compensate for signal attenuation caused by the signal splitting and/or to match the impedances of the incoming and outgoing coaxial transmission lines.

Figure 3:
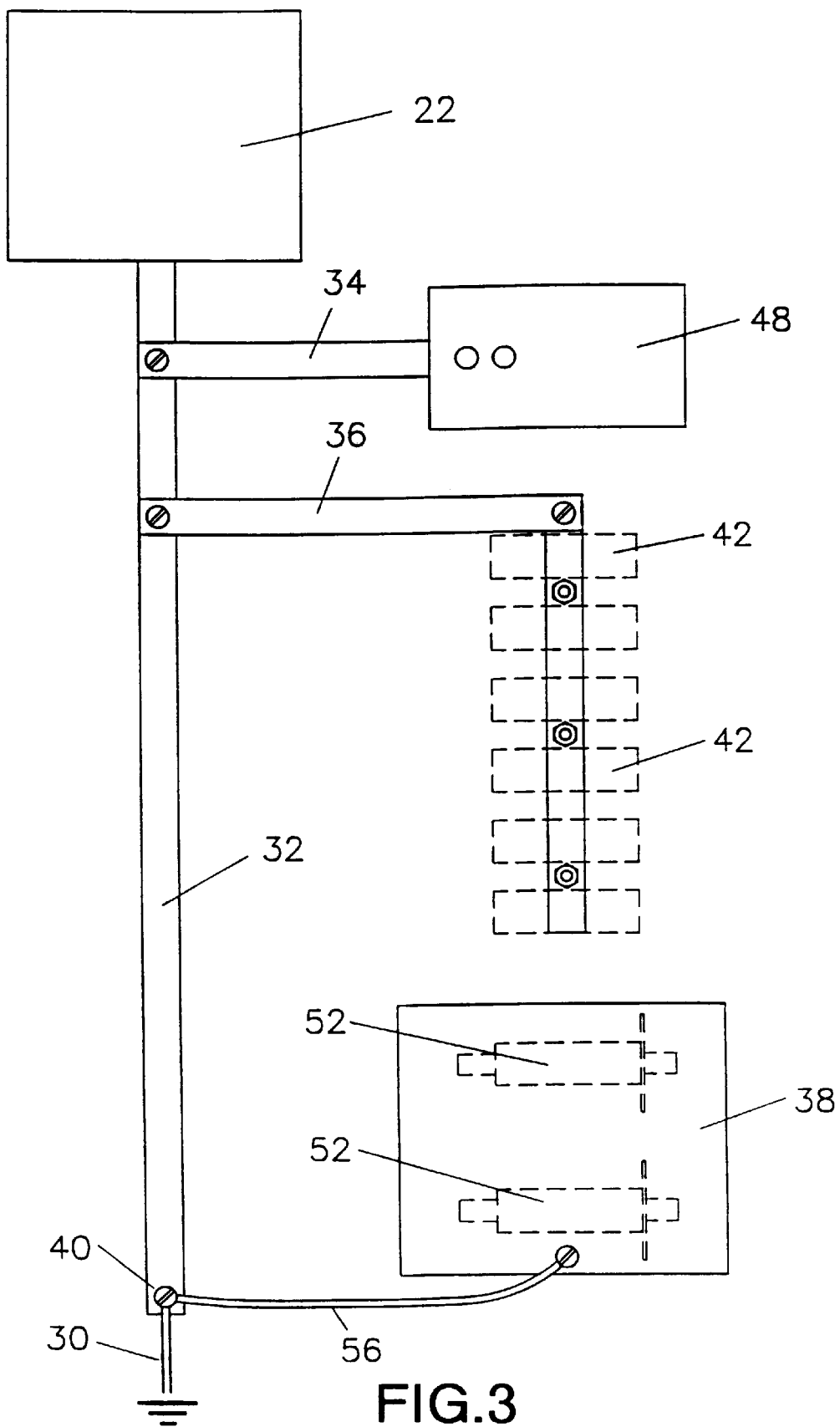
FIG. 3 is a schematic block diagram showing a first grounding arrangement for the residential protection service center of FIG. 1.
Figure 4:
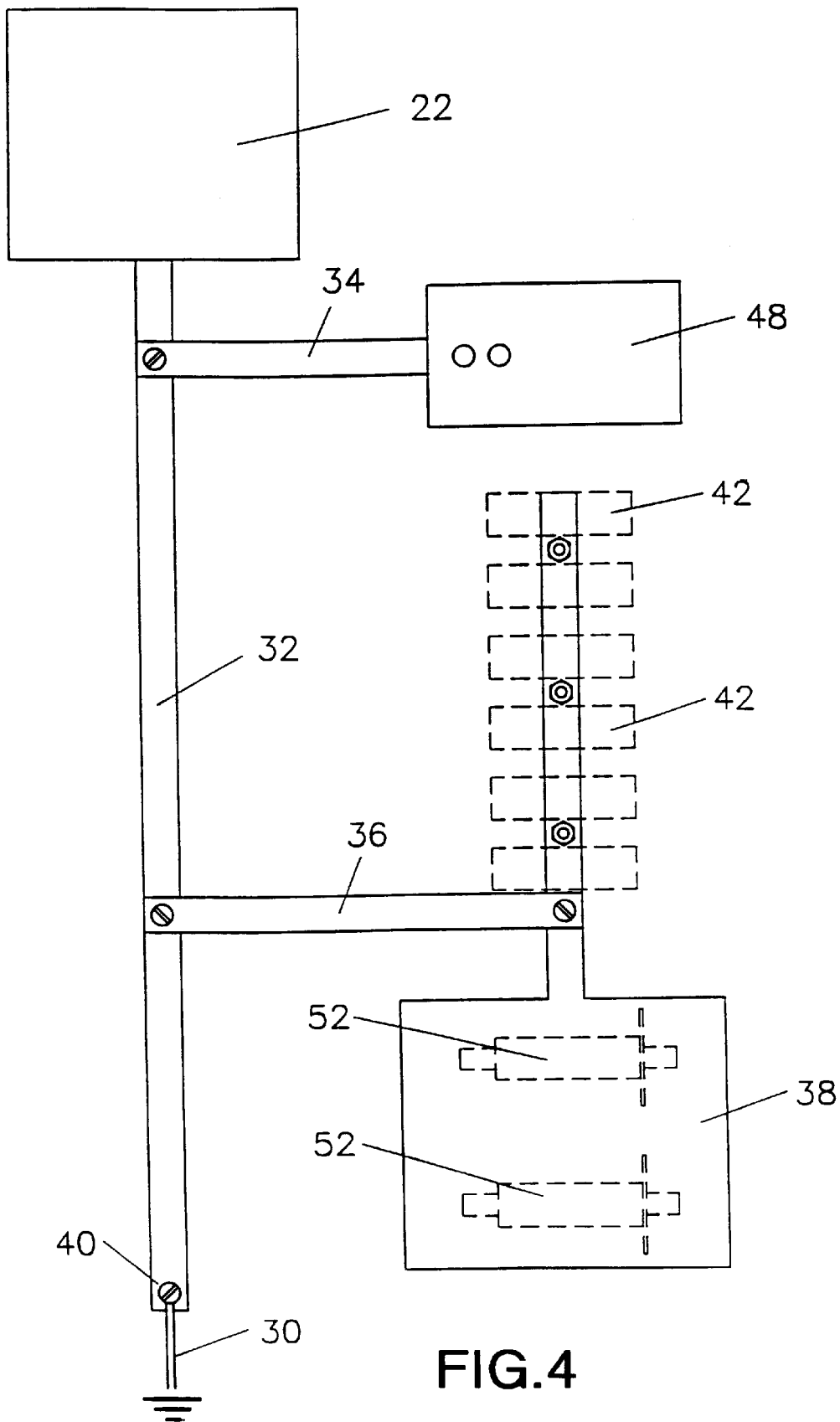
FIG. 4 is a schematic block diagram showing a second grounding arrangement for the residential protection service center of FIG. 1.
Figure 5:
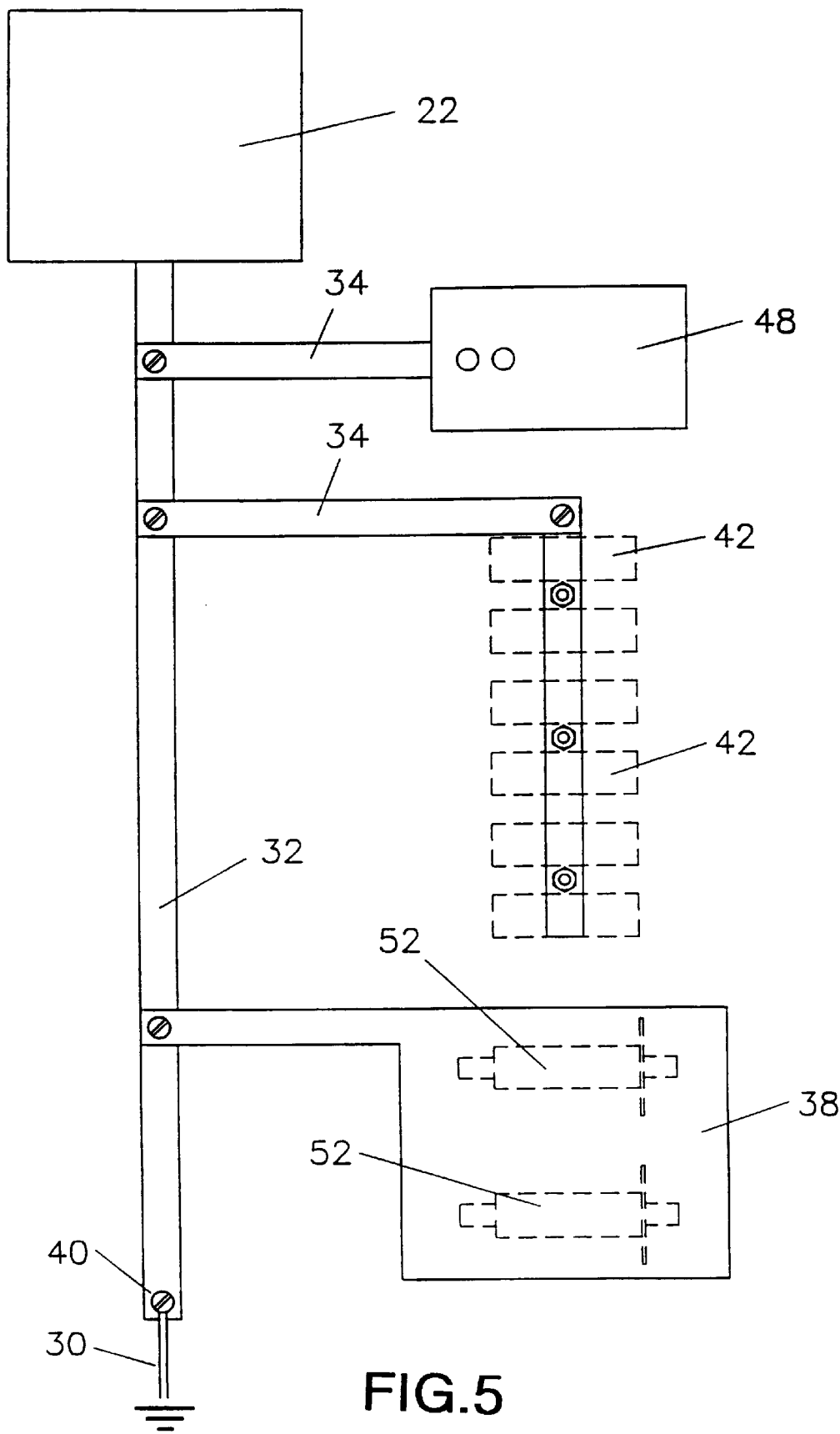
FIG. 5 is a schematic block diagram showing a third grounding arrangement for the residential protection service center of FIG. 1.

FIGS. 3 through 5 show various grounding arrangements for the residential protection service center of the present invention. Because the focus of FIGS. 3 through 5 is on grounding, various components located in enclosure 10 are indicated in FIGS. 3 through 5 by solid or dashed lines. Thus, AC power meter pan base 22, AC surge suppressor 48 and coax ground conductor 38 are indicated by solid lines, whereas the telephone line surge arrestors 42 and coaxial connectors 52 are indicated by dashed lines.

In FIG. 3 ground conductor 32 is the main ground bus and is connected between AC power meter pan base 22 and earth ground 30. Ground conductor 34 is connected between ground bus 32 and AC surge suppressor 48, ground conductor 36 is connected between ground conductor 32 and the telephone line surge arrestors 42, while ground conductor 56, shown as a jumper wire, connects the coax ground plate 38 to the point 40 where earth ground 30 is connected to the ground bus 32. Thus, the coax ground plate is connected directly to earth ground and is not connected to earth ground by means of ground conductor 36, which is used to ground telephone line surge arrestors 42.

In FIG. 4 ground conductor 32 is the main ground bus and is connected between AC power meter pan base 22 and earth ground 30. Ground conductor 34 is connected between ground bus 32 and AC surge suppressor 48, while ground conductor 36 is connected between ground bus 32 and both the telephone line surge arrestors 42 and the coax ground plate 38. In FIG. 4 the coax ground plate is connected to earth ground by means of the same ground bus 36 which is used to ground telephone line surge arrestors 42.

In FIG. 5 ground conductor 32 is the main ground bus and is connected between AC power meter pan base 22 and earth ground 30. Ground conductor 34 is connected between ground bus 32 and AC surge suppressor 48, ground conductor 36 is connected between ground bus 32 and the telephone line surge arrestors 42, while the coax ground plate 38 is connected to ground bus 32 at a point that is intermediate the connection 40 between earth ground 30 and ground bus 32 and the connection between ground bus 32 and AC power meter pan base 22. In both FIG. 5 and FIG. 3 the coax ground plate 38 is not grounded by means of ground bus 36 which is used to ground the telephone line surge arrestors 42. Only in the grounding arrangement shown in FIG. 4 is the coax ground plate 38 grounded using the ground bus 36.

Figure 6:
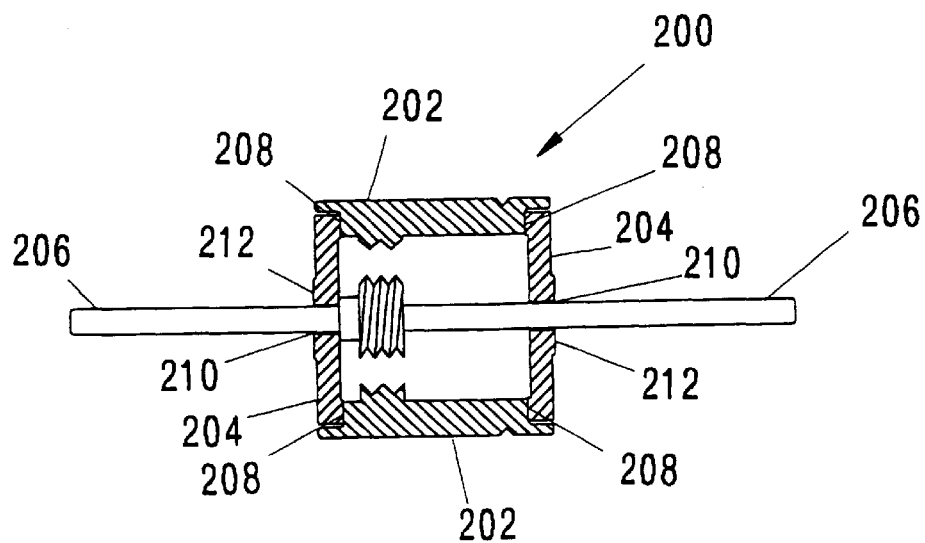
FIG. 6 is a cross-sectional view of a coaxial surge arrestor for use with the present invention.
Figure 14:
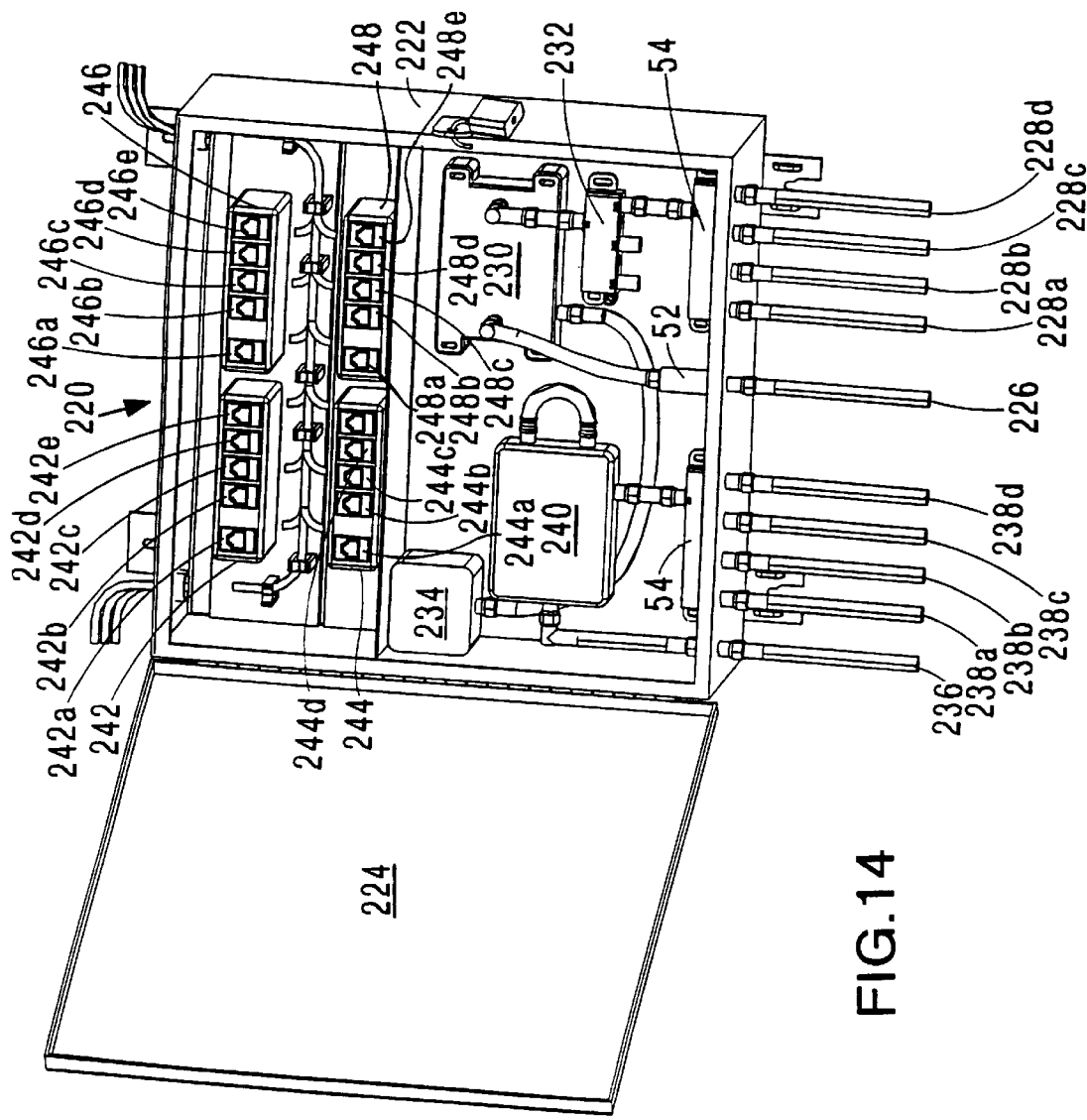
FIG. 14 is a perspective view of an internally-mounted residential protection service center according to a fourth embodiment of the present invention.

FIG. 6 is a reproduction of FIG. 14 from U.S. Pat. No. 5,566,056 issued to Chaudhry on Oct. 15, 1996. FIG. 6 illustrates a coaxial surge arrestor which may be used in the coaxial cable connector 52 of FIG. 2. As explained at column 6, line 54 through column 7, line 51 of U.S. Pat. No. 5,566,056, a portion of the interior surface 214 of conductive housing 202 and a portion of the exterior surface 216 of center conductor 206 are roughened, for example by threads or other forms of serration, to concentrate the electric field and increase the reliability of the gas discharge tube operation. In addition, as with conventional gas discharge tubes, the surfaces 214 and 216 are preferably coated with a low work function material to reduce the breakdown voltage and enhance the firing characteristics of the gas discharge tube.

The gas discharge occurs in the region "G" between surfaces 214 and 216. Region "G" is the active discharge region.

As also shown in FIG. 6, the distance between the inner surface of the conductive housing 202 and the outer surface of the center conductor 206 varies along the length of the center conductor. Put another way, the ratio of the inside diameter D of housing 202 to the outside diameter d of center conductor 206 varies along the length of the center conductor. The ratio D/d may vary by a factor of 2 or 3 or more along the length of center conductor 206. This variation in the ratio D/d is used to adjust the impedance of the gas discharge tube and for matching the impedance of the surge arrestor in which the gas discharge tube is located to that of the coaxial transmission line to which the surge arrestor is attached.

The impedance of a coaxial transmission line is proportional to the logarithm of (D/K)/d, where "D" is the inside diameter of the outer conductor, "d" is the outside diameter of the inner conductor and "K" is the dielectric constant of the medium between the inner and outer conductors. In the case of the gas discharge tube shown in FIG. 6, the medium is an inert gas which has a dielectric constant of approximately one. Therefore, the impedance of the gas discharge tube varies between the insulating ends as the logarithm of the ratio D/d. The insulating ends 204 are preferably ceramic and ceramic has a dielectric constant of about eight. By varying the ratio D/d along the length of center conductor 206 one can compensate for changes in impedance caused by, inter alia, the dielectric constants of the insulating ends 204. The portion of gas discharge tube 200 that is used for impedance matching is designated by the letter "I", to distinguish it from the active discharge region "G". See FIG. 14 of U.S. Pat. No. 5,566,056.

In addition to adjusting the ratio D/d within the gas discharge tube, it is also possible to adjust the length of the active gas discharge region "G" relative to the length of the impedance matching region "I" to match the impedance of the gas discharge tube to that of the coaxial transmission line. Thus, for a 50 ohm coaxial transmission line the ratio of the region "G" to the region "I" may be on the order of one to one whereas, for a 75 ohm coaxial transmission line, the ratio of the region "G" to the region "I" may be on the order of one to two.

Figure 7:
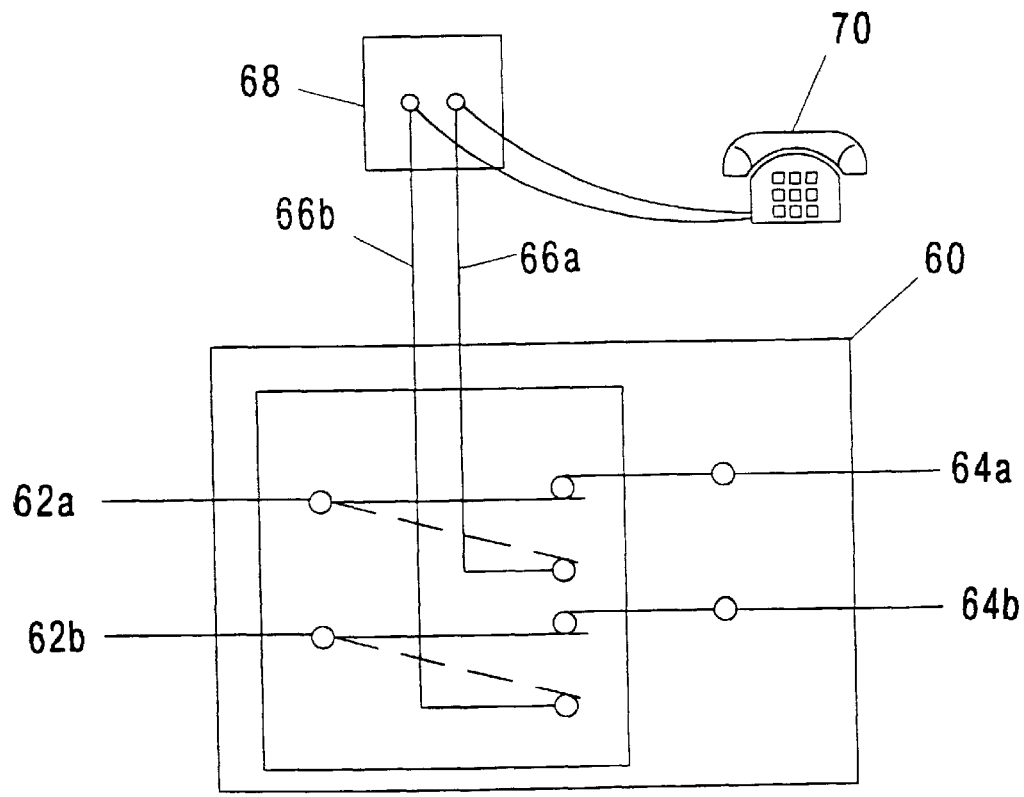
FIG. 7 is a schematic diagram of a switchable electrical socket for a subscriber bridge module for use with the present invention.

FIG. 7 shows a plug-actuated switchable RJ-11 type socket 60 for use in customer bridge module 44 shown in FIG. 2. Socket 60 is adapted to be connected to a test phone 70. Under normal operation (with no plug in the switchable socket) the telco wires 62a, 62b are connected to the customer wires 64a, 64b. When a plug is inserted in the socket, the telco wires are disconnected from the customer wires and are connected to wires 66a, 66b which are then connected to test phone 70. This arrangement provides a point of demarcation between the telco and customer lines.

Figure 8:
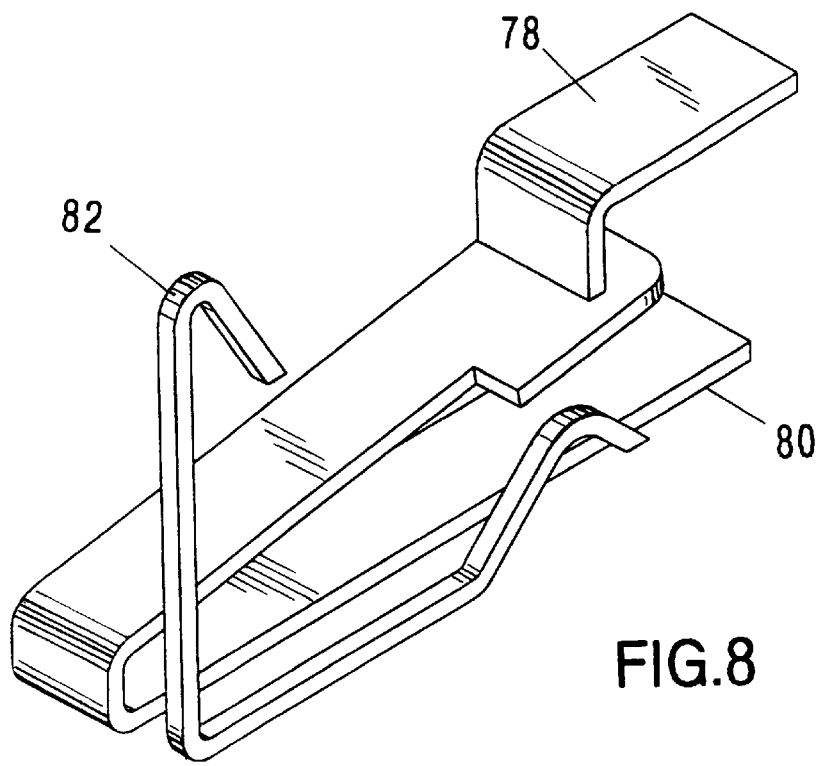
FIG. 8 is a perspective view of one set of electrical contacts for the switchable electrical socket shown schematically in FIG. 7.
Figure 9:
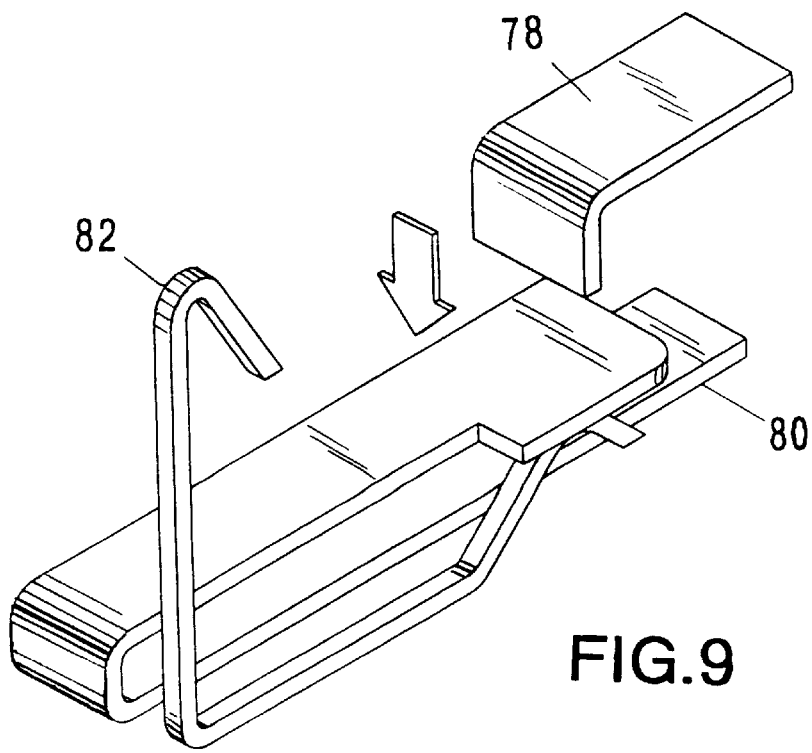
FIG. 9 is a perspective view of the same set of electrical contacts shown in FIG. 8 but with the contacts being shown in their test position.
Figure 17A:
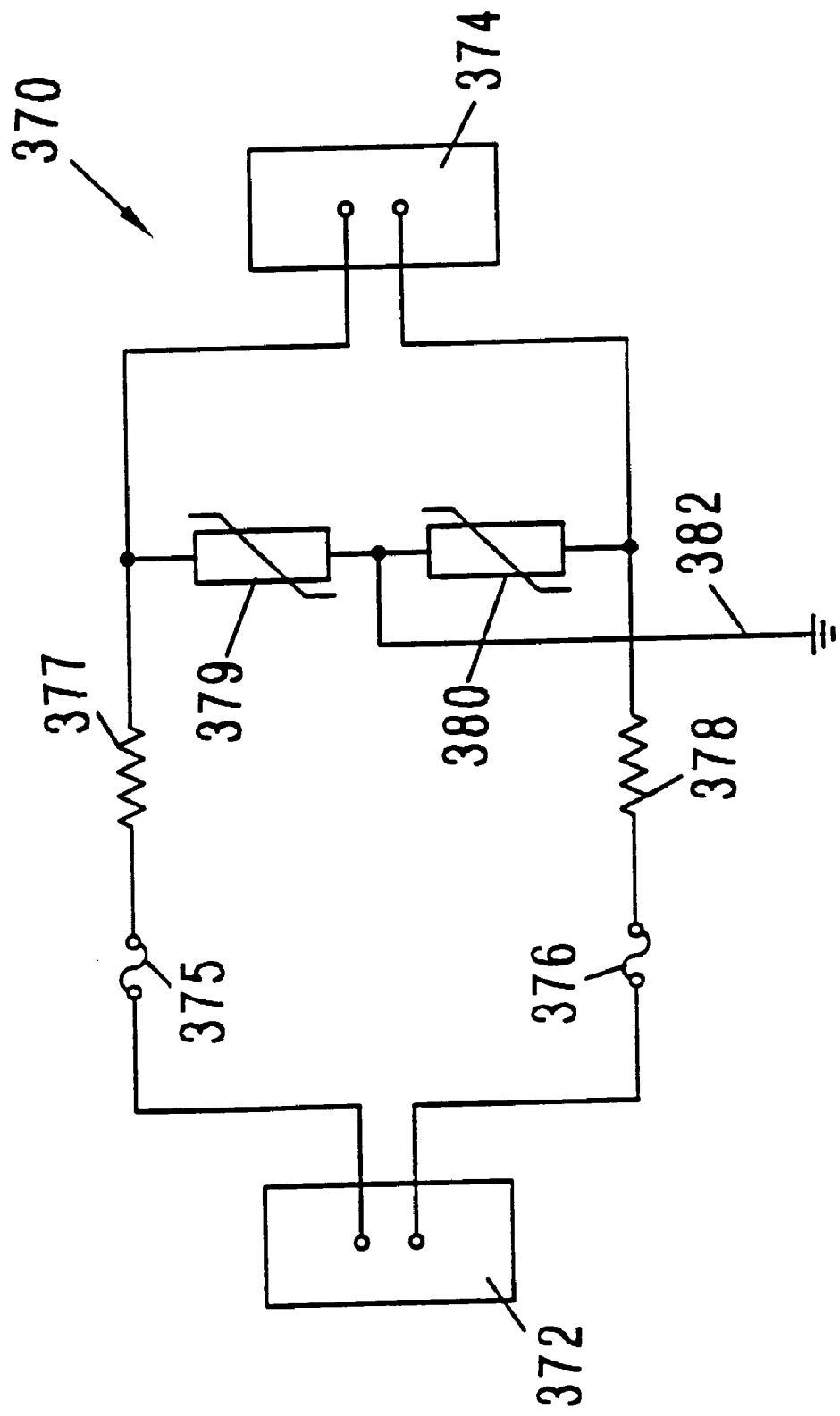
FIG. 17A is a schematic diagram of a telephone voice line overvoltage/overcurrent protection circuit for use with the present invention.
Figure 17B:
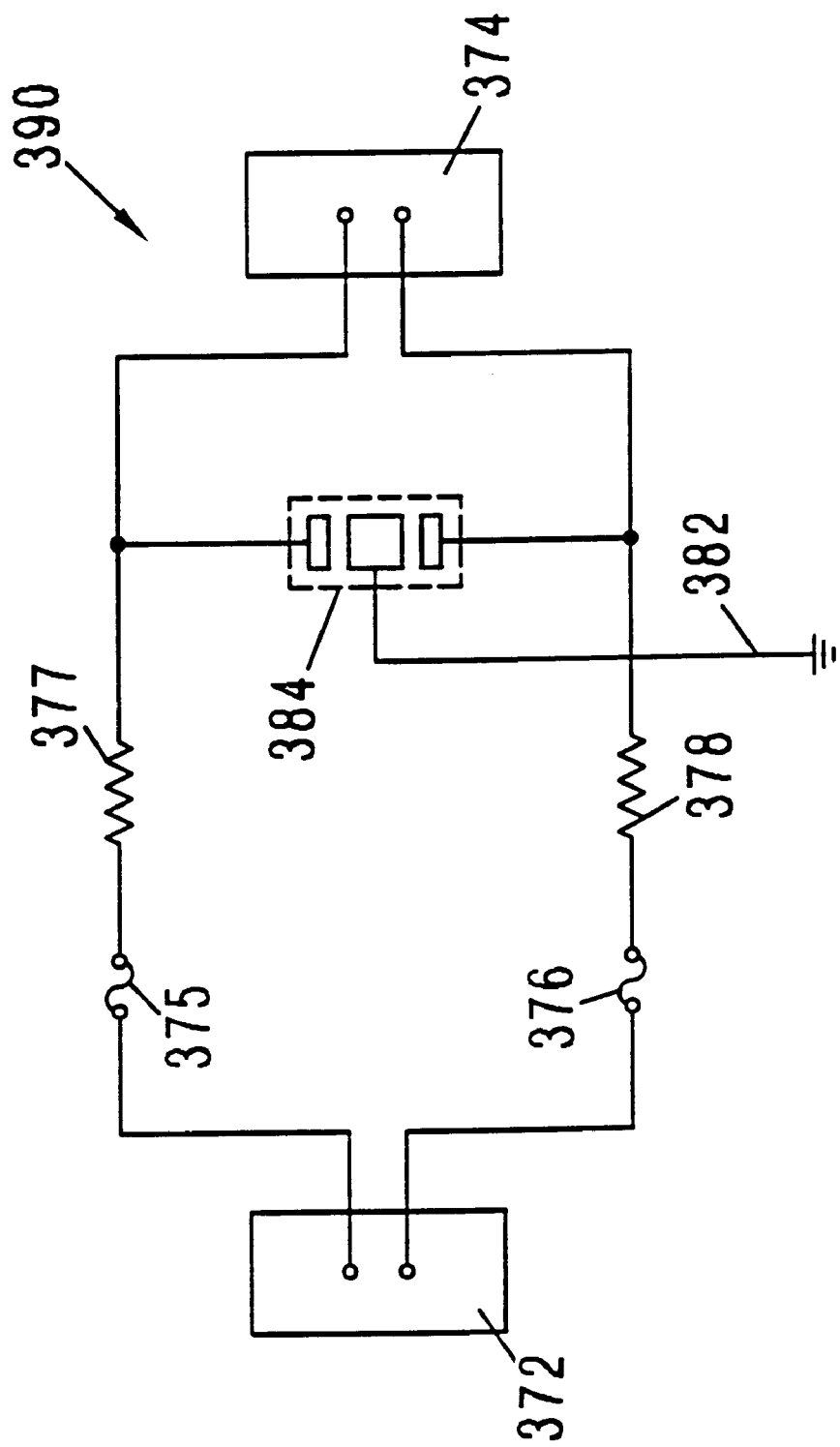
FIG. 17B is a schematic diagram of an alternative telephone voice line overvoltage/overcurrent protection circuit for use with the present invention.
Figure 18:
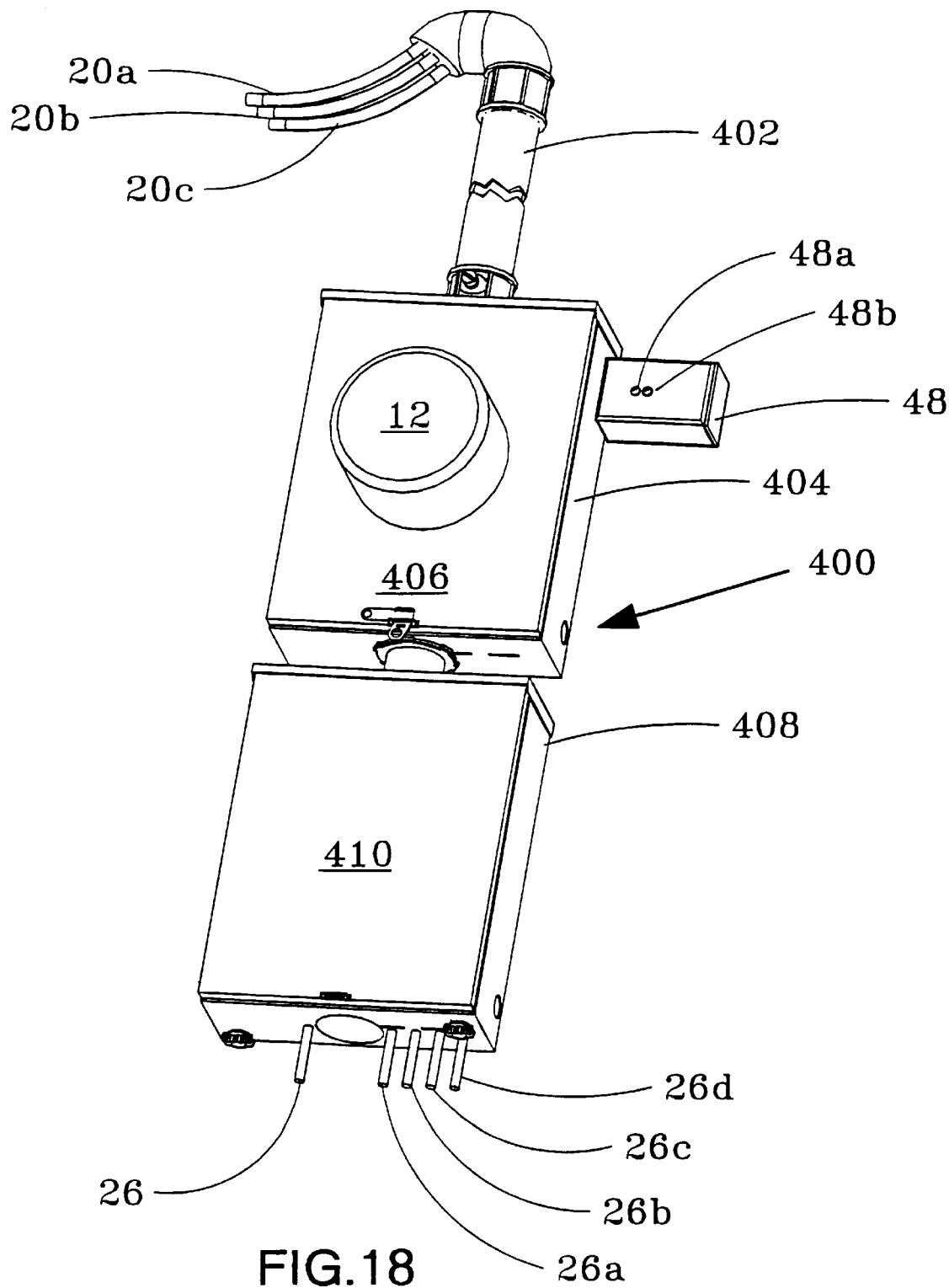
FIG. 18 is a perspective view of an externally-mounted residential protection service center according to a fifth embodiment of the present invention with the access cover in the closed position.

FIGS. 8 and 9 are reproduced from FIGS. 17 and 18 of U.S. Pat. No. 5,553,136 issued to Meyerhoefer et al on Sep. 3, 1996. As shown in FIGS. 8 and 9, the plug actuated switchable socket 60 has a customer contact 78 for connection to the customer wires, a telco contact 80 for connection to the telco wires and a test contact 82 for connection to a plug. The test contact 82 does not lie in the same plane as the customer and telco contacts 78 and 80. Note that the customer contact 78 and the telco contact 80 are of a heavier gauge material (and therefore have a greater current carrying capacity) than test contact 82. This increases the reliability of the switchable socket as a mechanism for connecting the telco and customer lines.

FIGS. 8 and 9 also show the interaction of the customer, telco and test contacts. As would be understood by a person of ordinary skill in the art, while FIGS. 8 and 9 only show one set of customer, telco and test contacts, switchable socket 60 actually has two sets of such contacts to accommodate the pair of telco and customer wires.

Figure 15:
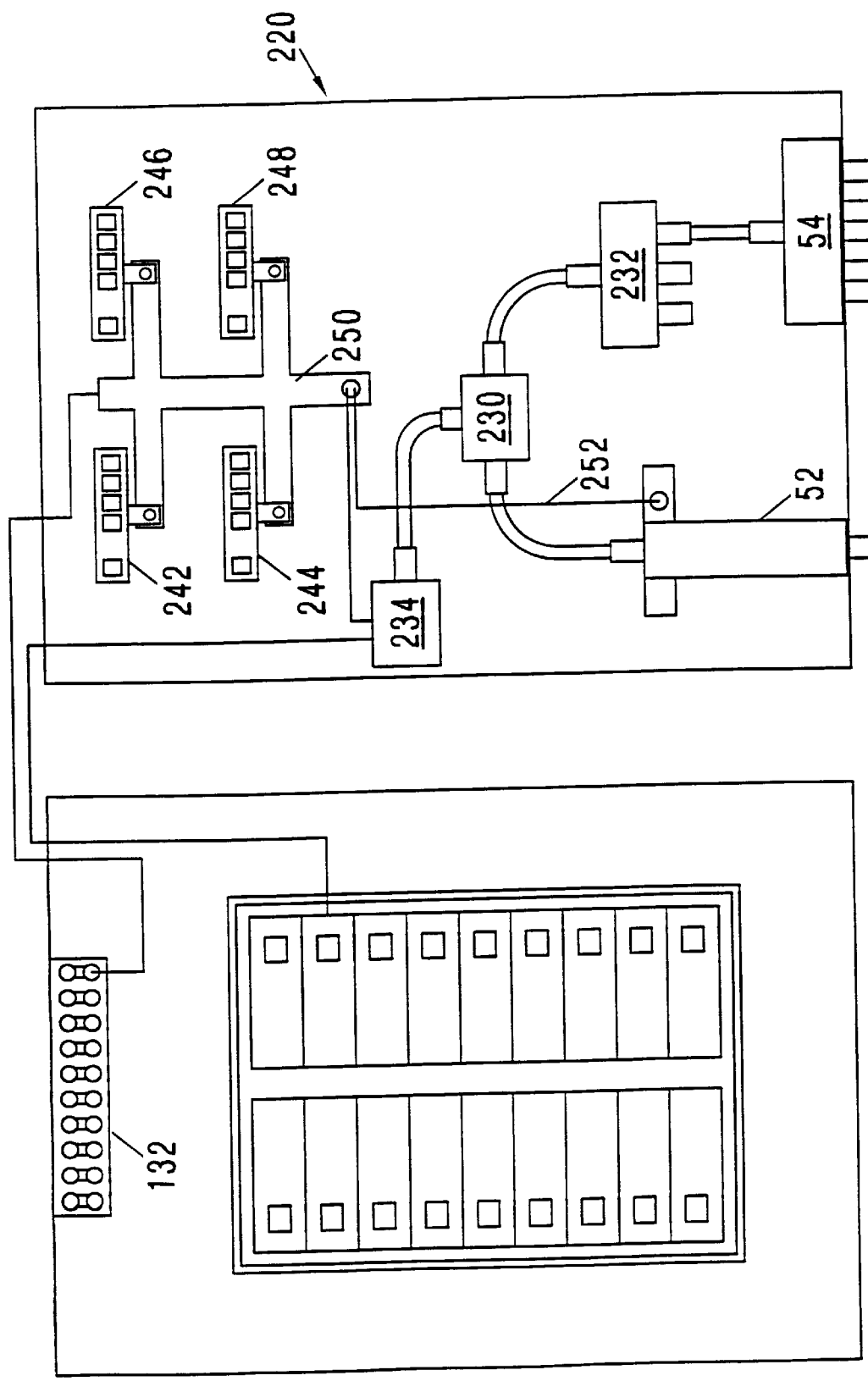
FIG. 15 is a schematic block diagram of the residential protection service center of FIG. 14.

When the plug is not plugged into switchable socket 60, the telco contact 80, and thus the telco wires, are connected to the customer contact 78, and thus the customer wires, and the test contact 82 is out of the circuit. When the plug is inserted in socket 60, the customer contact 78, and thus the customer wires, are disconnected from the telco contact 80, and thus the telco wires, and the telco contact and telco wires are connected to the test contact 82 in socket 60 which mate with contacts in the RJ-11 test plug. See also FIGS. 14–16 of U.S. Pat. No. 5,553,136 which show the mechanical interaction between the test plug and the switchable socket. FIGS. 14–16 are incorporated herein by reference.

Figure 10:
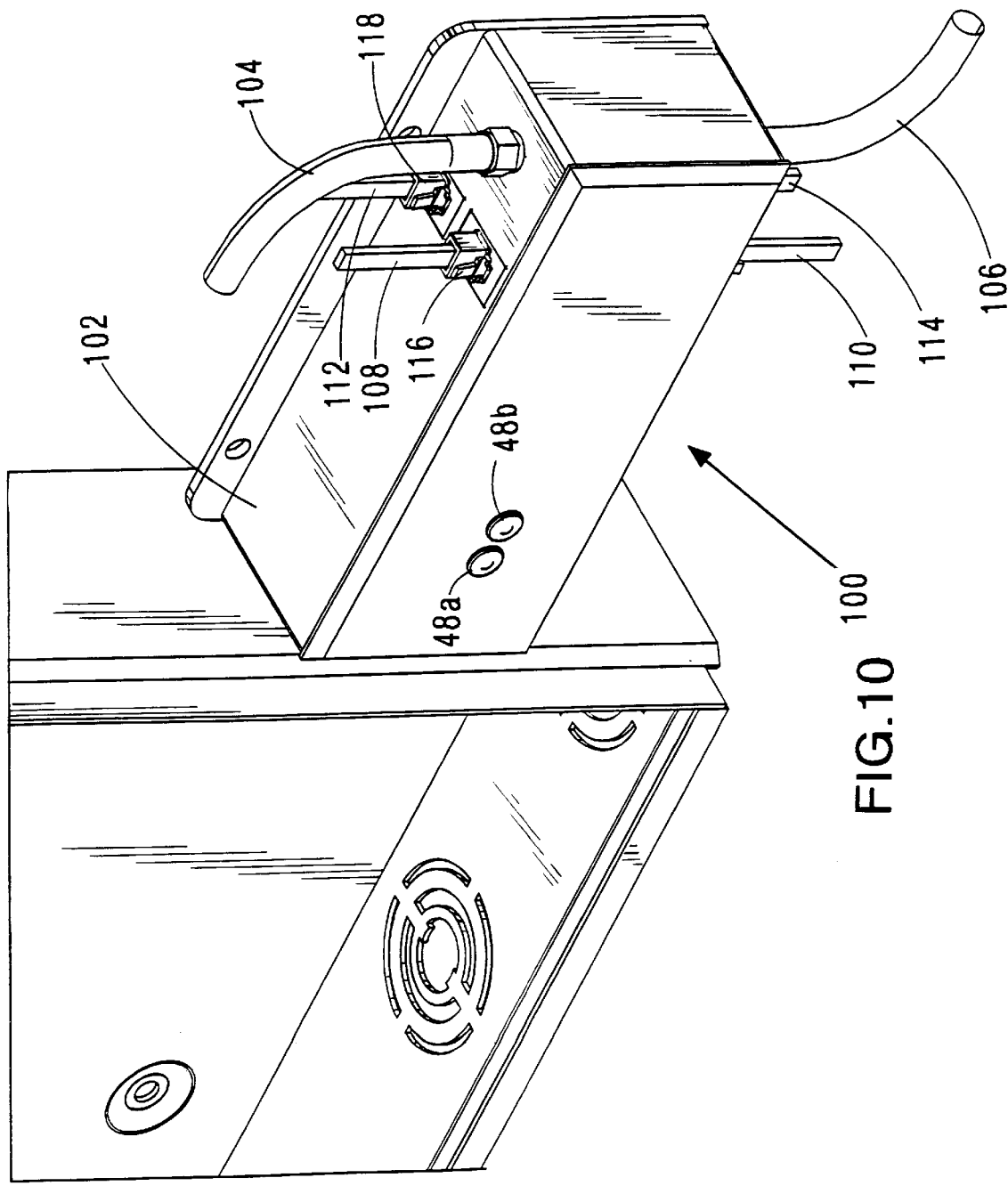
FIG. 10 is a perspective view of an internally-mounted residential protection service center according to a second embodiment of the present invention.

FIG. 10 is a perspective view of another residential protection service center according to the present invention. The protection center 100 is designed to be located within a residence and comprises an enclosure which contains AC power line protection, telephone voice line protection, high speed data line protection and coaxial transmission line protection. The AC power line protection may be a Model EMC 240A or a Model EMC 240B surge suppressor made by TII Industries, Inc., Copiague, N.Y. and identified in FIG. 2 by the numeral 48. The AC power line surge suppressor has indicators 48a, 48b which provide an indication when protection has failed for each of the AC lines.

Protection center 100 also provides protection for a coaxial transmission line having an input 104 and an output 106, a telephone voice line having an input 108 and the output 110 and a high speed data line having an input 112 and an output 114. The telephone voice line 108, 110 is shown connected to the protection center by RJ-type plugs and jacks 116, which are preferably RJ-11 plugs and jacks. The high speed data line 112, 114 is shown connected to the protection center by RJ-type plugs and jacks 118, which are preferably RJ-45 plugs and jacks.

Although only one coaxial transmission line is shown in FIG. 10, there could be multiple coaxial transmission lines from, e.g., CATV and a satellite dish antenna. Similarly, while only one telephone voice line and one high speed data line are shown, there could be multiple telephone voice lines and/or multiple high speed data lines. FIG. 10 is intended merely to illustrate some of the different types of telecommunications lines that may be protected using a common ground.

The coaxial transmission line is preferably protected by a coaxial surge suppressor which has previously been described. See coaxial surge suppressor 52 in FIG. 2 and coaxial surge suppressor 200 in FIG. 6 and U.S. Pat. No. 5,566,056. The preferred overvoltage/overcurrent protection circuits for the high speed data line 112, 114 are shown schematically in FIGS. 16A and 16B which are described in detail later. The preferred overvoltage/overcurrent protection circuits for the telephone voice line are shown schematically in FIGS. 17A and 17B which are described in detail later. The overvoltage/overcurrent protection circuit for the telephone voice line is connected between RJ-11 jacks mounted on enclosure 102, while the overvoltage/overcurrent protection circuit for the high speed data line is connected between the RJ-45 jacks mounted on enclosure 102.

Figure 11:
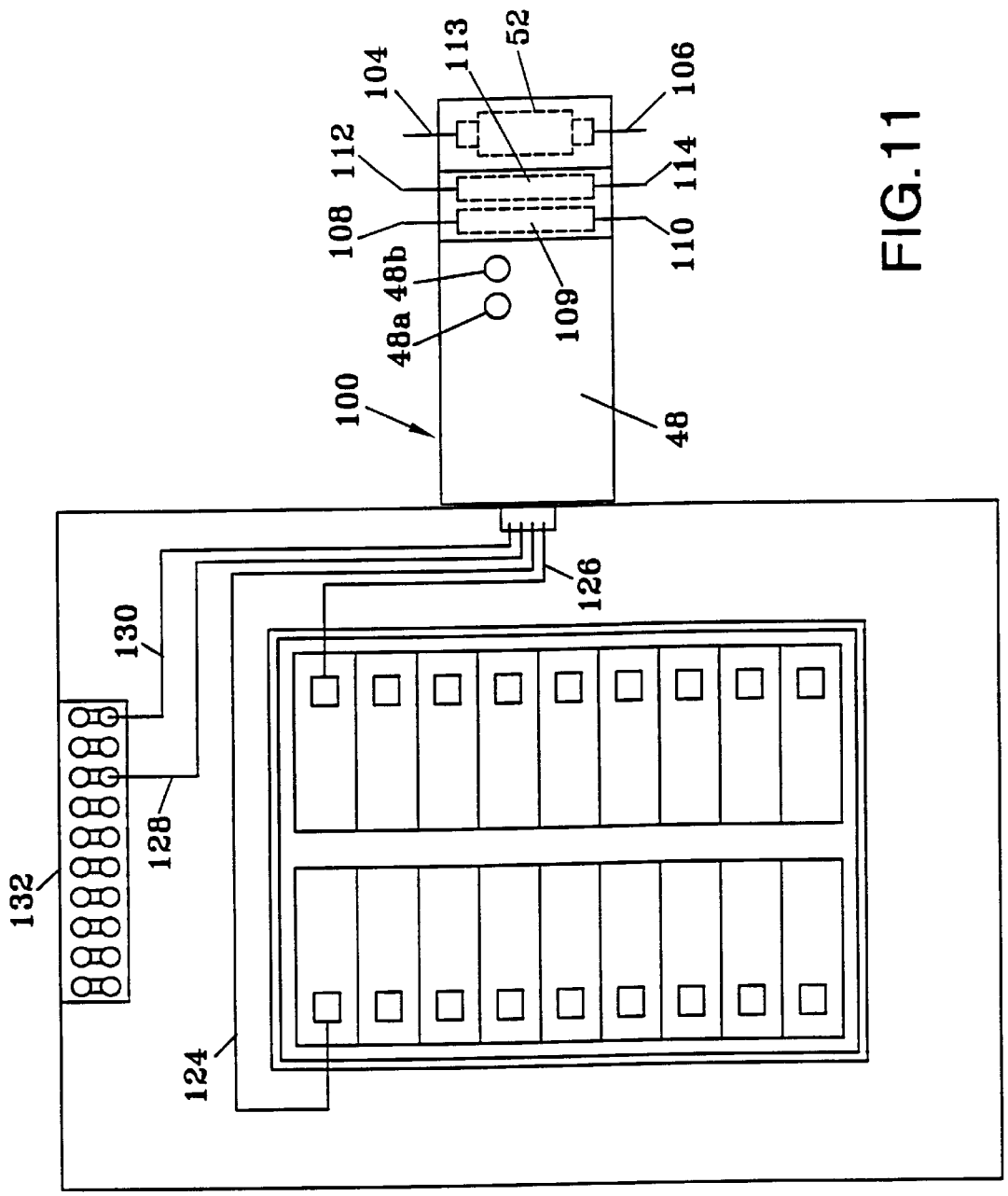
FIG. 11 is a schematic block diagram of the residential protection service center of FIG. 10.

FIG. 11 is a schematic block diagram of the residential protection service center of FIG. 10. FIG. 11 shows the coaxial transmission line 104, 106 and the coaxial surge suppressor 52 which protects the coaxial transmission line from overvoltage conditions. FIG. 11 also shows the telephone voice line 108, 110 and the overvoltage and overcurrent protection circuit 109 which protects that line from overvoltage and overcurrent conditions. Also shown in FIG. 11 is the high speed data line 112, 114 and the overvoltage and overcurrent protection circuit 113 which protects that line from overvoltage and overcurrent conditions.

FIG. 11 also shows the manner in which the protection center is wired into a circuit breaker panel or distribution panel. As shown in FIG. 11, four wires are connected between the protection center and the panel: wire 124 is connected to one AC line, wire 126 is connected to a second AC line, wire 128 connected to AC neutral, while wire 130 is connected to a common ground. In the TII EMC 240 device, wires 124 and 126 are black, wire 128 is white and wire 130 is green. In the protection center 100 the grounds for the AC protection, the coax protection, the telephone voice line protection and the high speed data line protection are preferably all connected together.

Figure 12:
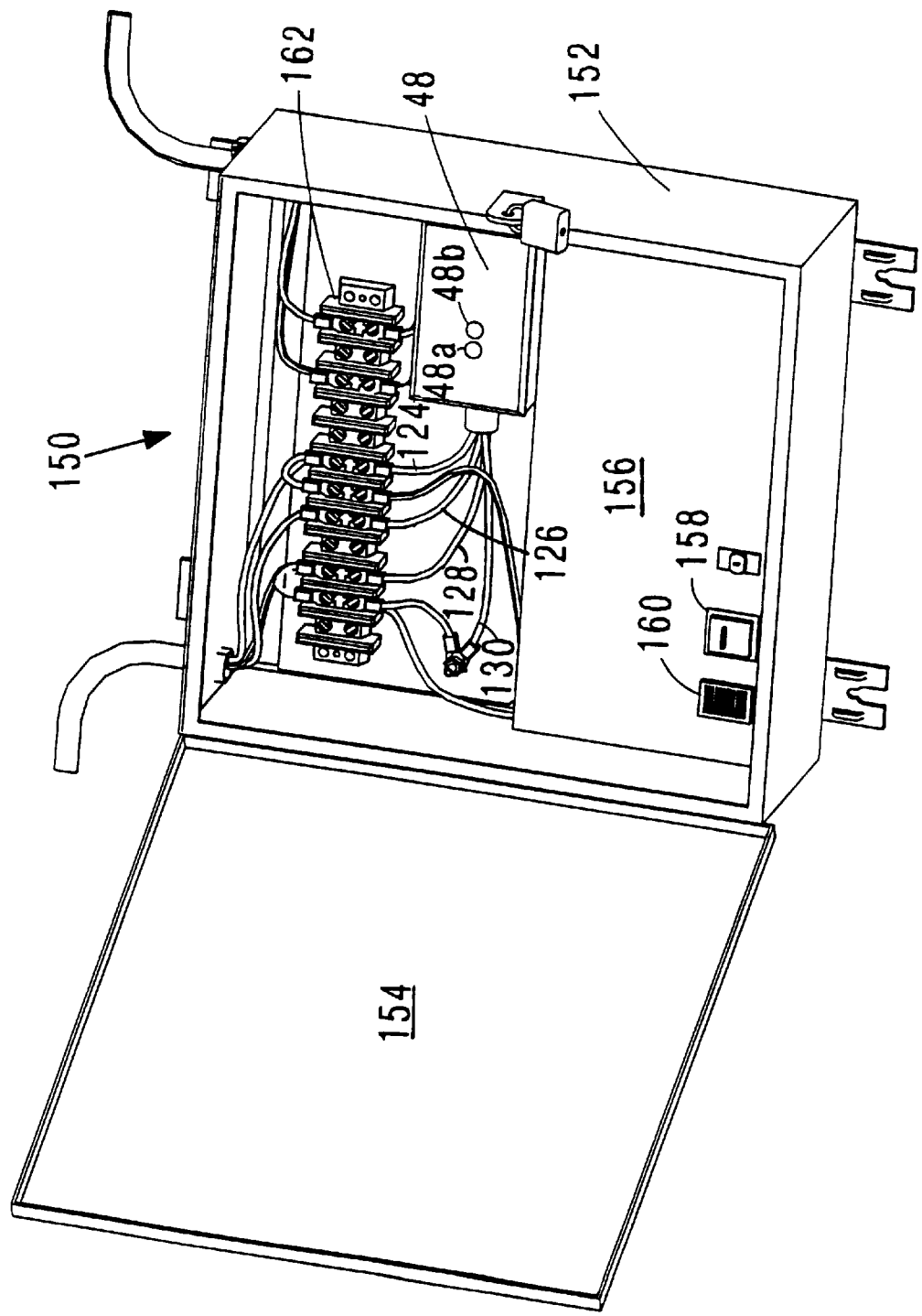
FIG. 12 is a perspective view of an internally-mounted residential protection service center according to a third embodiment of the present invention.

FIG. 12 is a perspective view of another residential protection service center according to the present invention. FIG. 12 shows a protection center 150 which is designed to be located within a residence and which comprises an enclosure having a base 152 and a cover 154. Mounted in the enclosure is an AC power line protector 48 (previously described) having indicators 48a and 48b. Also mounted in the enclosure is an uninterruptible power supply (UPS) 156 which has an ON/OFF switch 158 and an indicator light 160. The AC power line protector 48 and UPS 156 are connected by means of a terminal block 162. The four wires (124, 126, 128, 130) from AC power line protector 48 are numbered as in FIG. 11.

Figure 13:
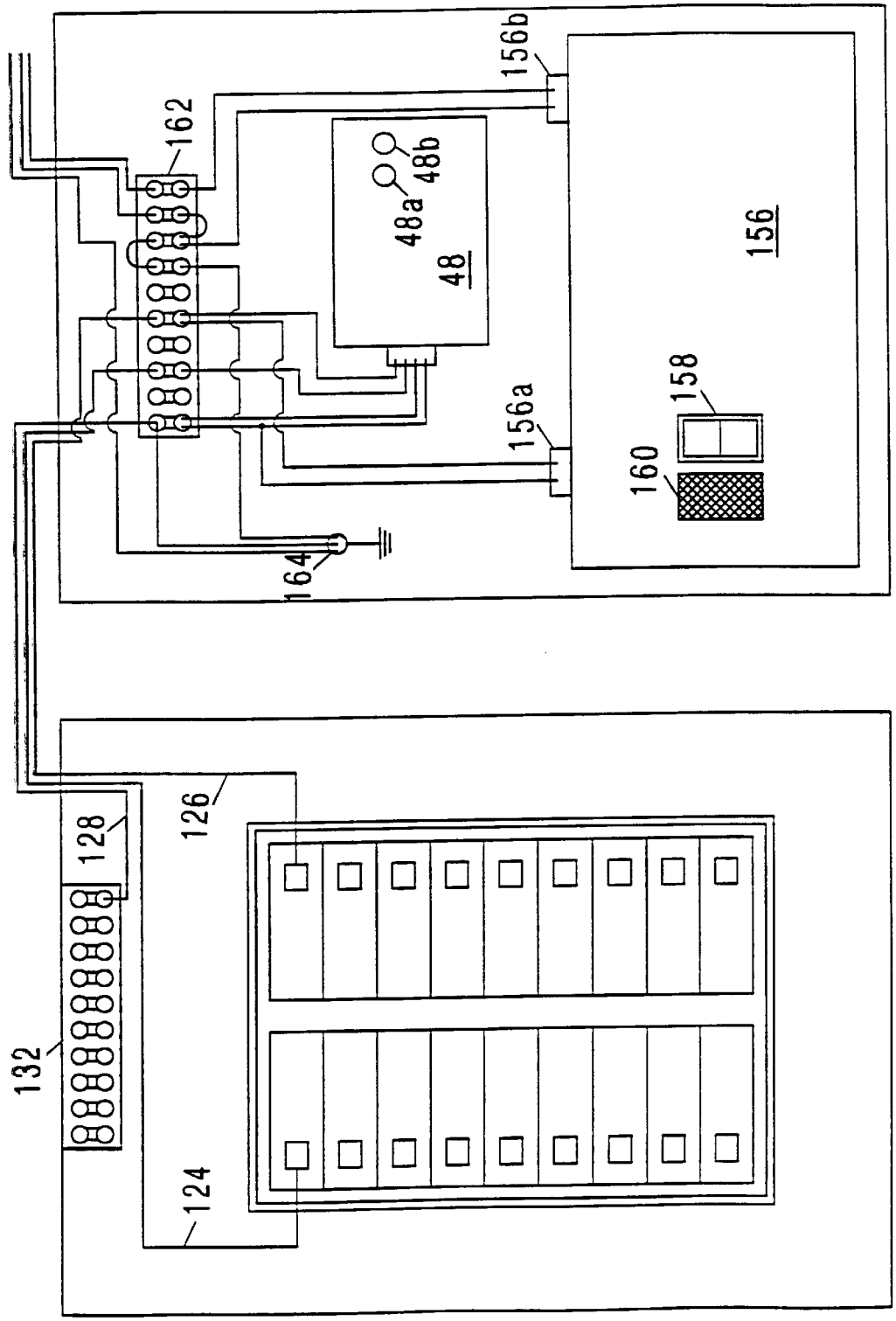
FIG. 13 is a schematic block diagram of the residential protection service center of FIG. 12.

FIG. 13 is a schematic diagram of the residential protection service center of FIG. 12. The input 156a of UPS 156 is connected to the source of AC power through terminal block 162, while the output 156b of UPS 156 is connected to the load through terminal block 162. UPS 156 and AC protector 48 are connected to a common ground 164 which is connected to a ground bus 132 in the distribution panel.

FIG. 14 is a perspective view of another residential protection service center according to the present invention. Protection center 22 is designed to be located inside a residence and comprises an enclosure having a base 222 and a cover 224. The enclosure houses the protection for telephone voice lines, high speed data lines and coaxial transmission lines. Coaxial surge arrestor 52 (previously described) is connected to an external coaxial transmission line 226 which may carry CATV or satellite TV signals. The output of coaxial surge arrestor 52 is connected to the input of RF amplifier 230. The output of RF amplifier 230 is connected to a 1×3 coaxial splitter 232, one output of which is connected to a 1×4 coaxial splitter 54 (see FIG. 2). The outputs 228a through 228d from splitter 54 are then distributed within the residence as desired. Power is supplied to RF amplifier 230 by AC power transformer 234.

The protection center 220 also handles the distribution of internal coaxial transmission lines used, for example, for local area networks (LAN's) within the residence. Coaxial transmission line 236 is an internal coaxial transmission line coming, for example, from a router. It is connected to the input of a block converter 240, a/k/a a distribution device (DD). The output of block converter 240 is connected to a 1×4 coaxial splitter 54 which produces outputs 238a through 238d which may then be distributed throughout the residence as desired.

Protection center 220 also provides protection for telephone voice lines and high speed data lines using, for example, modular splitters containing the appropriate protection circuits. As shown in FIG. 14, protection center 220 contains modules 242 and 244 which are adapted to be connected to telephone voice lines and which contain overvoltage and overcurrent protection circuits for the telephone voice lines. Module 242 contains an input jack 242A and four output jacks 242b through 242e, while module 244 contains an input jack 244a and output jacks 244b through 244e. Each module 242, 244 splits an input telephone voice line into four output voice lines while simultaneously protecting the telephone voice line from overvoltage and overcurrent conditions. The actual protection circuits for the telephone voice line are shown in FIGS. 17A and 17B which are described later.

Protection center 220 also contains modules 246 and 248 which are adapted to be connected to high speed data lines and which contain overvoltage and overcurrent protection circuits for the high speed data lines. Module 246 contain an input jack 246a and four output jacks 246b through 246e, while module 248 contains an input jack 248a and four output jacks 248b through 248e. Each module 246, 248 splits an input high speed data line into four output high speed data lines while simultaneously protecting the high speed data line from overvoltage and overcurrent conditions. The actual protection circuits for the high speed data line are shown in FIGS. 16A and 16B which are described later.

As shown in FIG. 14, the jacks in modules 244 through 248 are preferably RJ-type jacks and the protection circuits are connected between the input and output jacks. RJ-11 jacks are preferably used in the telephone voice line modules, while RJ-45 jacks are preferably used in the high-speed data line modules.

FIG. 15 is a schematic diagram for the residential protection service center 220 of FIG. 14. Only the protection portion of protection center 220 is shown in FIG. 15. Thus, the internal coaxial transmission line distribution system, which is not protected by coaxial surge suppressors, is not shown in FIG. 15. The protection center 220 is connected to ground bus 132 in the distribution panel so as to provide a common ground. AC power is also supplied to power transformer 234 from the distribution panel. Within protection center 220 all of the protection circuits and devices are tied to a common ground. Thus, protection center 220 contains a ground bus 250 to which the telephone voice line protection modules 242, 244 and the high speed data line protection modules 246, 248 are connected. Coaxial surge suppressor 52 is connected to ground bus 250 by ground conductor 252.

It should be noted that while FIGS. 12 and 14 show the AC power line protection and UPS in one enclosure, and the telephone voice line, high speed data line and coaxial transmission line protection in another enclosure, all of the protection could be included in a single enclosure. How the protection is physically split among enclosures is a matter of choice. Thus, all or a part of the protection could be included in the same enclosure which contains the circuit breaker panel. No matter how physically segregated, the protection apparatus is still preferably tied to a common ground.

The common ground can be provided by a ground bus located, for example, in the circuit breaker panel or by connecting individual ground wires to an earth ground external to the residence or by a combination of the foregoing. Best protection is obtained when all of the grounds are connected together in close physical proximity.

FIG. 16A is a schematic diagram of an overvoltage and overcurrent protection circuit 300 which is adapted to be connected in series with an unshielded twisted pair of wires carrying incoming digital signals in an Ethernet network or "X" DSL, which includes various forms of Digital Subscriber Line technology. Circuit 300 has an input (receive) side and an output (receive) side. The input side is adapted to be connected to a source of digital signals at terminals 312 and 314. The source may, for example, be the output from an optical network unit (ONU), a concentrator, a computer, a local area network (LAN) or a wide area network (WAN). The output side of circuit 300 is adapted to be connected to a destination of digital signals at terminals 340 and 342. The destination may, for example, be a computer or a LAN and one or more servers and one or more personal computers (PCs) may be connected to the LAN.

Circuit 300 provides both primary and secondary overvoltage protection as well as overcurrent protection. The overcurrent protection is provided by positive temperature coefficient resistors (PTCRs) 316 and 318 which are connected in series with the unshielded twisted pair of wires carrying the incoming digital signals. PTCRs may be type TR600-150 which are available from Raychem Corp., Menlo Park, Calif. The primary overvoltage protection section comprises a three-electrode gas discharge tube 320 which is connected across the twisted pair of wires which carry the incoming digital signals. Gas discharge tube 320 conducts when the voltage on either of the twisted wires exceeds a threshold value. The breakdown voltage may be between about 150 and about 300 volts, with a breakdown voltage of on the order of 250 volts being preferred. A suitable three-electrode gas discharge tube is shown in Napiorkowski, U.S. Pat. No. 4,212,047. Suitable three-electrode gas discharge tubes are also available from TII Industries, Inc., Copiague, N.Y. as TII 71 type or 73/75 type with a voltage breakdown range of 150–300 VDC.

As will be understood by persons skilled in the art, two two-electrode gas discharge tubes may be used in lieu of a single three electrode gas discharge tube and using two two-electrode electrode gas discharge tubes is the full equivalent of using one three-electrode gas discharge tube. In the present invention three-electrode gas discharge tubes are preferred to two-electrode gas discharge tubes and, therefore, three-electrode gas discharge tubes are shown in FIGS. 16A and 16B.

The secondary overvoltage protection section of circuit 300 comprises diodes 326 through 336 and avalanche diode 338. Diodes 326 through 332 form a diode bridge and avalanche diode 338 is connected across the diode bridge. The diode bridge is connected across the twisted pair of wires carrying the incoming digital signals and limits the voltage on those wires in the event that the voltage substantially exceeds, for example, the normal digital signal levels. Typical digital signal levels are plus or minus five volts. Diodes 326 through 332 may be type IN4007, 1 amp, 1000 volt PIV diodes. Diodes 334 and 336 may be type RL204G, 2 amp, 1000 volt PIV diodes. Diode 338 may be a type 1.5KE12, 12 volt avalanche diode. Alternatively, diode 338 may be two series-connected low capacitance, 6 volt 1500 watt diodes made by Samtech of 650 Mitchell Road, Newbury Park, Calif. 91320 and sold under part number LC01-6.

Using two avalanche diodes connected in series provides two benefits: (1) the surge energy handling capability of the protector doubles and (2) the capacitance offered to the diode bridge is halved. Two avalanche diodes connected in parallel could also double the surge handling capability, but diodes do not have the same breakdown voltage, and therefore do not share energy equally. Moreover, using two avalanche diodes connected in parallel causes the capacitance to the diode bridge to double, which could significantly attenuate the digital signal.

Excessive positive voltages appearing at terminal 340 are clamped by diodes 326 and 336 and avalanche diode 338. Excessive negative voltages appearing at terminal 340 are clamped by diodes 328 and 334 and avalanche diode 338. Excessive positive voltages appearing on terminal 342 are clamped by diodes 332 and 336 and avalanche diode 338. Excessive negative voltages appearing at terminal 342 are clamped by diodes 330 and 334 and avalanche diode 338. If diode 338 is a 12 volt avalanche diode, then voltages exceeding about plus or minus 15 volts would be clamped by the secondary protection circuit. If diode 338 is two series-connected 12 volt avalanche diodes, then voltages exceeding about 35 volts would be clamped by the secondary protection circuit. Avalanche diodes are available with many different breakdown voltages and the clamping voltage may be chosen by selecting suitable avalanche diodes.

FIG. 16B is a schematic diagram of an overvoltage and overcurrent protection circuit 350 which is the same as circuit 300 and operates the same way. Terminals 352 and 354 are connected to the unshielded twisted pair of wires carrying high speed digital signals from the destination back to the source, while terminals 356 and 358 are connected to the unshielded twisted pair of wires that are connected to the source.

FIG. 17A is a schematic diagram of an overvoltage and overcurrent protection circuit 370 for a telephone voice line. Circuit 370 is connected between RJ-11 jacks 372 and 374. Circuit comprises fuses 375 and 376, which may be 250 volt, 350 milliampere fuses made by Littelfuse and sold under part number 220-003. These fuses protect against overcurrent conditions. Circuit 370 also includes resistors 377 and 378 which may be 10 ohm, 5 watt resistors. These resistors limit the current which flows through the circuit in the event of an overvoltage condition. Circuit 370 also includes MOVs 379 and 380 which may be obtained from Harris Semiconductor Corp. under part number V180ZA10. The MOVs start clamping at around 200 volts and the maximum clamping voltage is about 300 volts. Conductor 382 is connected to ground and grounds MOVs 379 and 380.

FIG. 17B is a schematic diagram of an alternative overvoltage and overcurrent protection circuit 390 for a telephone voice line. The only difference between circuit 370 and circuit 390 is that circuit 370 used a pair of MOVs whereas circuit 390 uses a three-electrode gas tube. In this application a three-electrode gas tube is equivalent to a pair of MOVs connected back-to-back. Instead of a three-element gas tube a pair of two-element gas tubes connected back-to-back could also be used. A suitable three-element gas tube is a TII 11 gas tube made by TII Industries, Inc., Copiague, N.Y.

FIG. 18 is a perspective drawing of another embodiment 400 of the residential protection service center of the present invention. As shown in FIG. 18, the protection center is designed to be mounted on the outside of the residence. AC power lines 20a, 20b and AC neutral 20c are brought into an enclosure having a base 404 and access cover 406 by means of a conduit 402. The enclosure also contains the AC power meter 12. Attached to the enclosure is an AC overvoltage protection circuit 48 (previously described) having indicators 48a and 48b.

Figure 19:
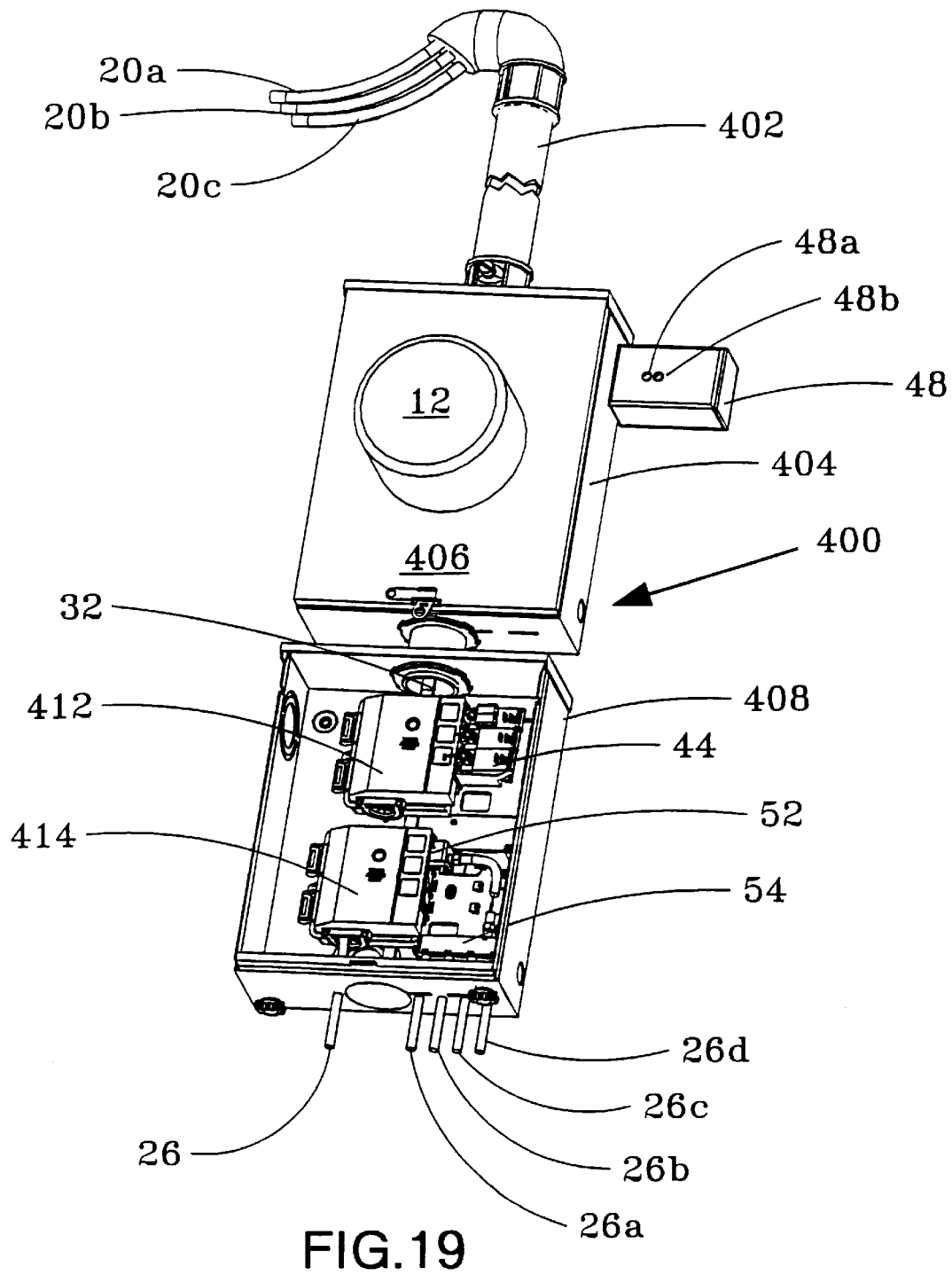
FIG. 19 is a perspective view of the residential protection service center of FIG. 18 with the access cover removed and the covers in the network interface devices in the closed position.

A second enclosure comprising base 408 and access cover 410 is located below the first enclosure. The second enclosure receives telephone lines (not shown) and a coaxial transmission line 26. FIG. 19 shows the second enclosure with the access cover removed. As shown in FIG. 19, the second enclosure contains network interface devices (NIDs) 412 and 414 and subscriber bridge modules 44. NID 412 handles the telephone lines while NID 414 handles the coaxial transmission lines. A ground conductor 32 is connected between the first and second enclosures to establish a common ground. While this is the preferred arrangement, separate ground conductors could be run from each enclosure and connected to an earth ground.

Figure 20:
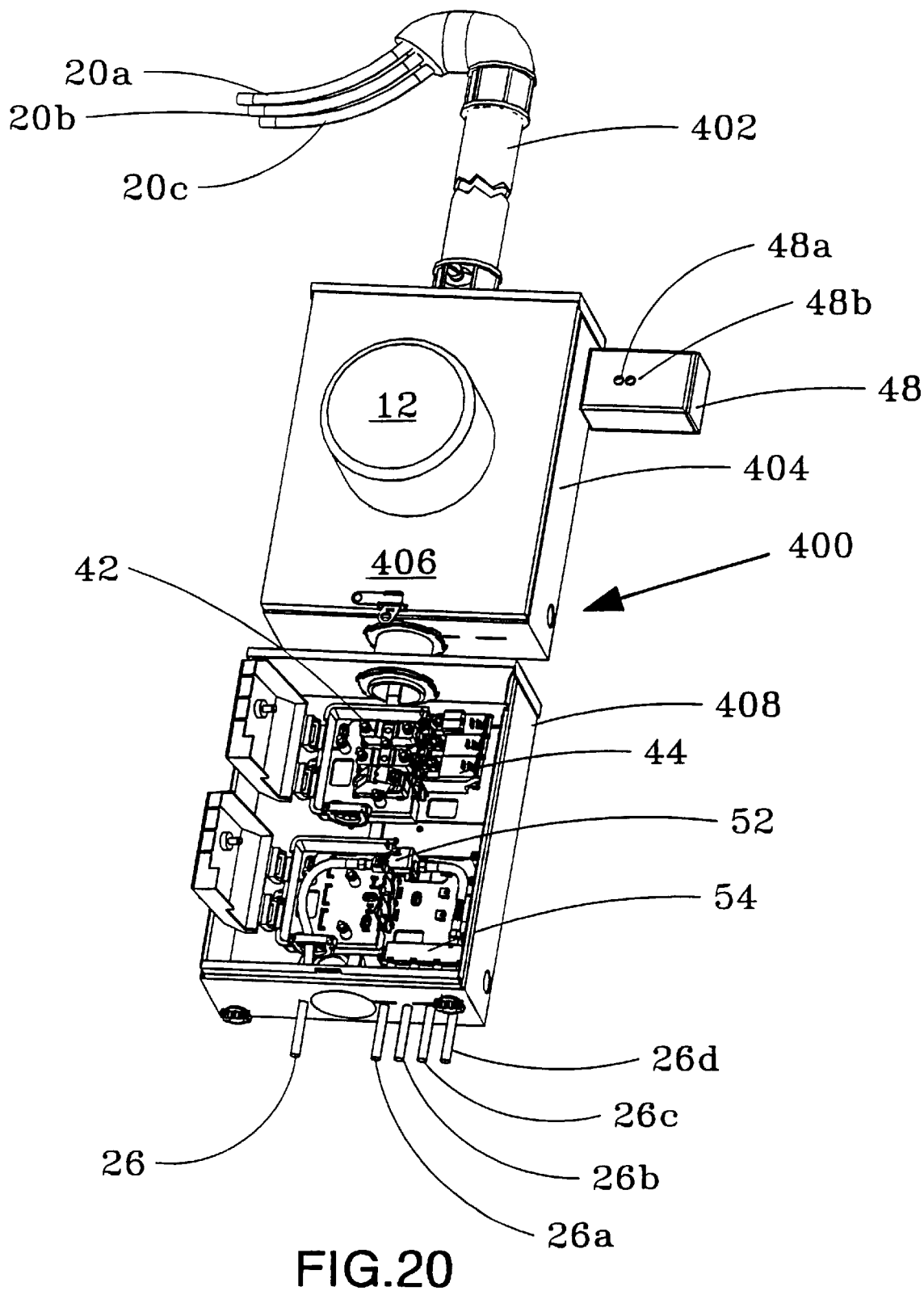
FIG. 20 is a perspective view of the residential protection service center of FIG. 18 with the access cover removed and the covers on the network interface devices in the open position.

FIG. 20 shows the second enclosure with the access cover removed and the covers on NIDs 412 and 414 in the open position. As shown in FIG. 20, NID 412 contains overvoltage protection devices 42 which provide the primary overvoltage protection for the telephone lines. NID 414 contains a coaxial surge arrestor 52 (previously described) which provides the primary overvoltage protection for the coaxial transmission line. A 1×4 coaxial splitter 54 is connected to the output of the coaxial surge arrestor and splits input coaxial line 26 into four output coaxial lines 26a through 26d.

Figure 21:
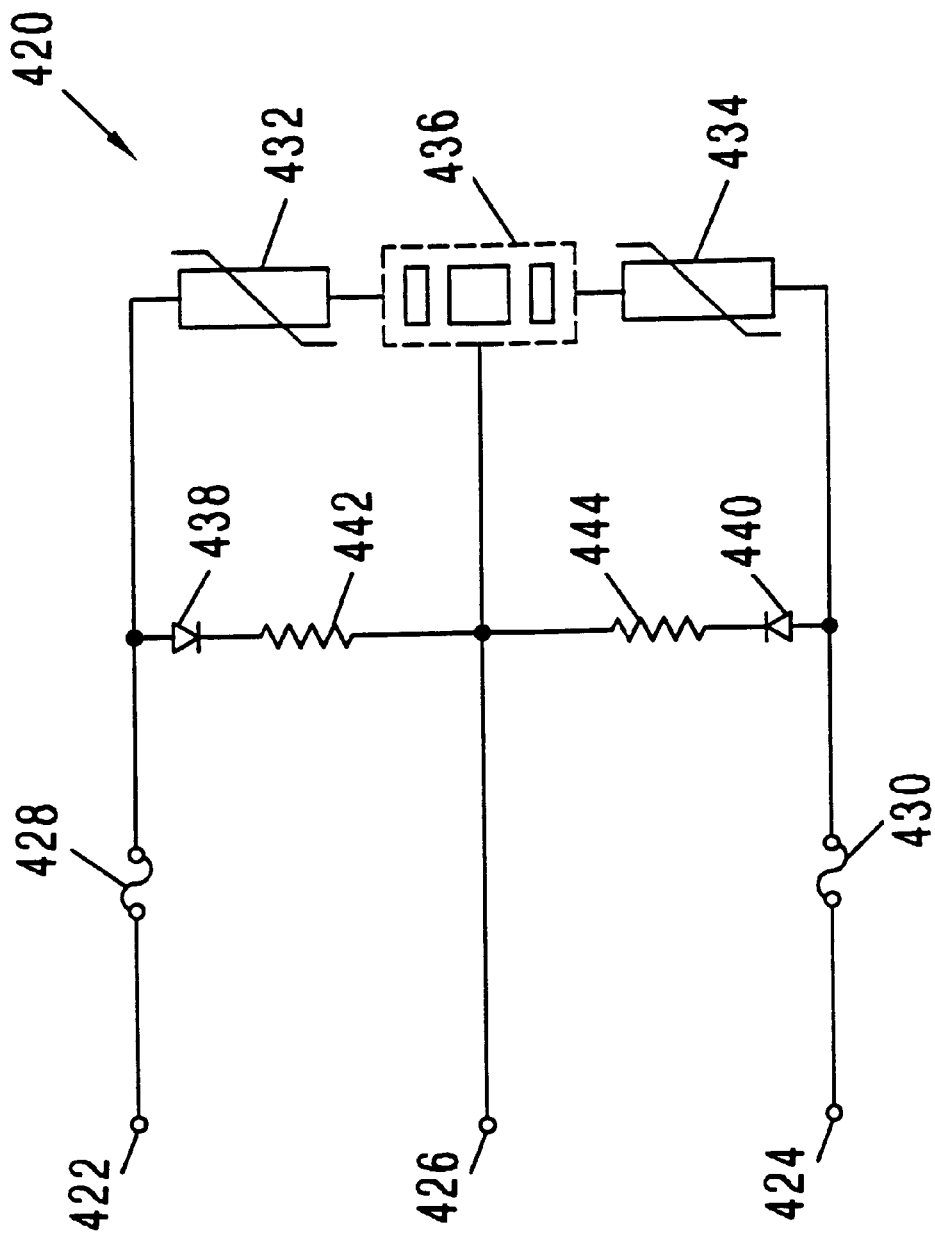
FIG. 21 is a schematic diagram of an alternative AC power line overvoltage protector for the residential protection service centers of FIGS. 2, 10, 12 and 18.

FIG. 21 is a schematic diagram of an alternative AC overvoltage protection circuit 420 which may be used in any of the residential protection service centers shown in FIGS. 2, 10, 12 and 18 in lieu of the EMC 240 devices. Circuit 420 is connected to the AC power lines at terminals 422 and 424 and to the AC neutral at 426. Circuit 420 comprises temperature sensing fuses 428 and 430. Suitable fuses are made by Microtemp Corp. and are available under part number 4178A1. Connected to fuses 428 and 430, respectively, are MOVs 432 and 434 which may be obtained from Harris Semiconductor Corp. under part number V131A40. Connected between the two MOVs and to the AC neutral is a three-electrode gas tube 436 which may be a TII 11 gas tube made by TII Industries, Inc., Copiague, N.Y. MOVs 432 and 434 start clamping at about 200 volts and have a maximum clamping voltage of about 350 volts, while gas tube 436 may have a breakdown voltage of 260 to 600 volts. Although a single three-electrode gas tube 436 is shown in FIG. 21, a pair of two-electrode gas tubes connected back-to-back could also be used and are equivalent to a three-electrode gas tube in this application. Connected between one AC line and the AC neutral are light emitting diode (LED) 438 and series resistor 442. Connected between the other AC line and the AC neutral is a second LED 440 and a second resistor 444. LEDs 438 and 440 may be green and are available from Dial Light Corp. while resistors 442 and 440 may be 10K ohm, one-half watt resistors. The LEDs are illuminated when overvoltage protection is in effect. See indicators 48a and 48b in FIG. 2.

As noted above, fuses 428 and 430 are temperature sensitive fuses. Thus, as the temperature of the fuse increases, the current carrying capacity of the fuse decreases. Fuses 428 and 430 are located in close physical proximity to MOVs 432 and 434 and gas tube 436. In the absence of an overvoltage condition, gas discharge tube 436 presents an open circuit (essentially infinite impedance) and, therefore, no current flows through MOVs 432 and 434. When an overvoltage condition exists, gas discharge tube 436 conducts (presenting a low impedance) and the MOVs clamp the AC lines to a low voltage, thereby preventing the energy from entering the residence. The use of a gas discharge tube in combination with the MOVs has two advantages. First, it extends the life of the MOVs because there is no leakage current through the MOVs in the absence of an overvoltage condition. Second, because the MOVs only conduct when an overvoltage condition exists, lower voltage MOVs can be used which clamp the AC lines to a lower voltage than would be possible if a gas discharge tube were not used. This enhances the protection provided by the overvoltage protection circuit.

Figure 22:
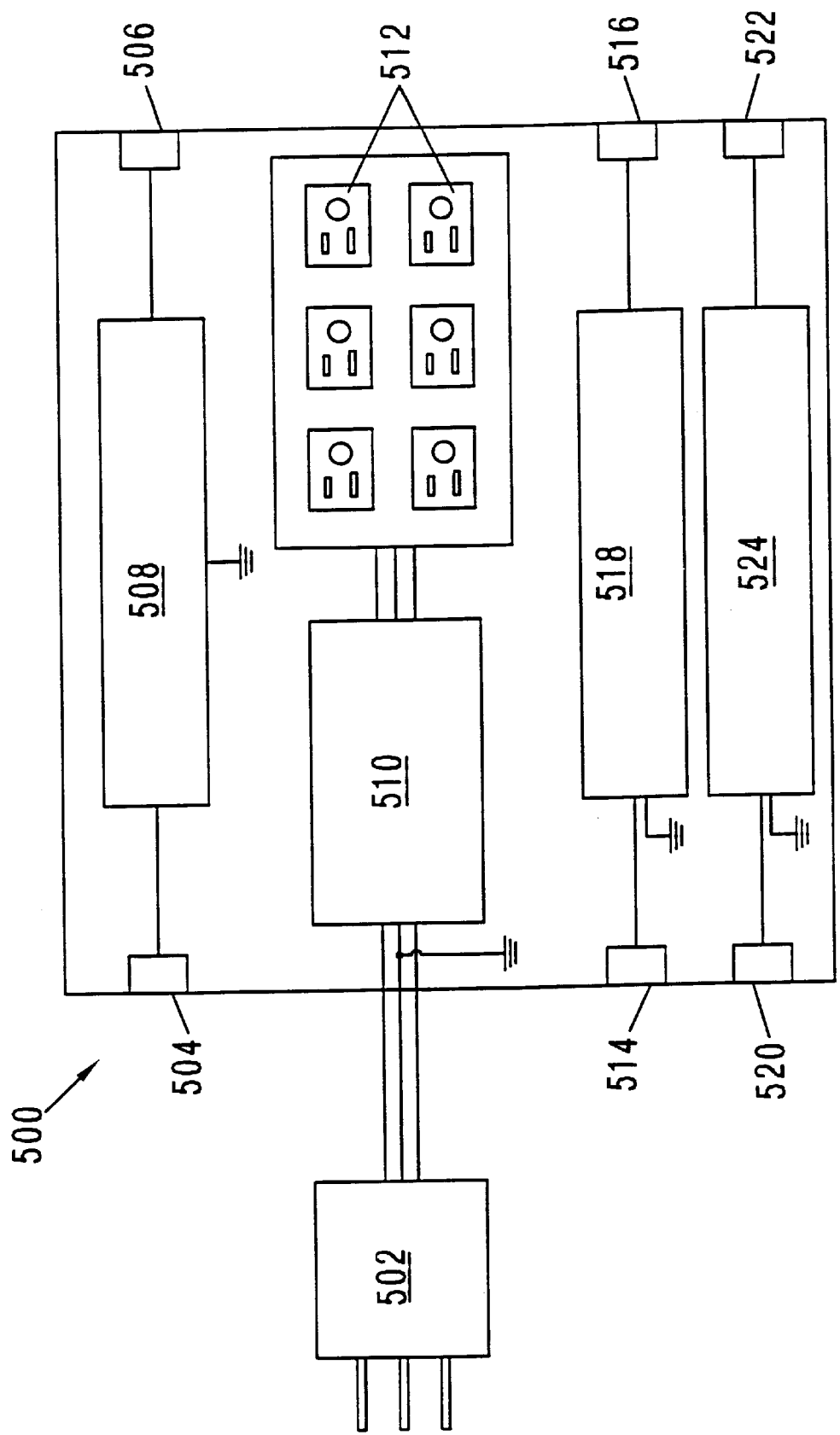
FIG. 22 is a schematic block diagram of a plug-in secondary surge suppressor for use with the residential protection service center of the present invention.

FIG. 22 is a schematic block diagram of plug-in surge suppressor 500 for use with the residential protection service center of the present invention. Surge suppressor 500 comprises a three-prong male AC plug 502 which is adapted to plug into an AC outlet. It has three conductors: AC line, AC neutral and ground. Surge suppressor 500 has RJ-11 jacks 504 and 506 to which a telephone voice line may be connected. Between jacks 504 and 506 is an overvoltage and overcurrent protection circuit 508 which may take the form of either of the circuits shown in FIGS. 17A and 17B. Surge suppressor 500 also has RJ-45 jacks 520 and 522 to which a high speed data line may be connected. Between jacks 520 and 522 are overvoltage and overcurrent protection circuits which may take the form of the circuits shown in FIGS. 16A and 16B. Surge suppressor 500 also has F-type coaxial connectors 514 and 516 to which a coaxial transmission line may be connected. Between connectors 514 and 516 is a coaxial surge arrestor which may take the form of the device shown in FIG. 6 and described in U.S. Pat. No. 5,566,056. Surge suppressor 500 also contains an AC overvoltage protection circuit 510 and multiple female AC outlets 512.

Figure 23:
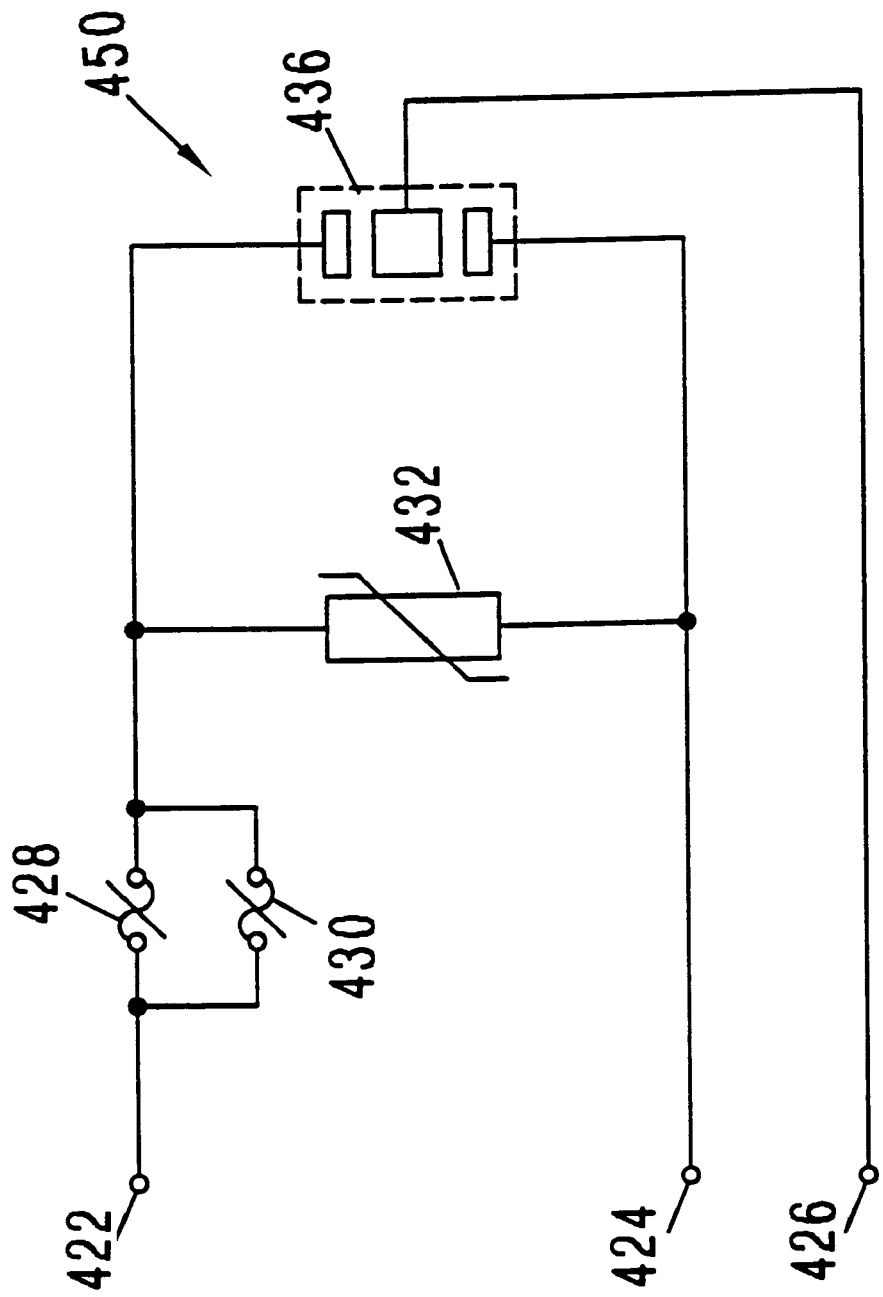
FIG. 23 is a schematic diagram of an AC protection module for use in the plug-in surge suppressor of FIG. 22.

The AC overvoltage protection circuit is described in greater detail in FIGS. 23 through 28. FIG. 23 is a schematic diagram of one AC overvoltage protection circuit 450 in accordance with the present invention. Circuit 450 is connected to the AC power line at 422, to the AC neutral at 424 and to the common ground in the surge suppressor at 426. Circuit 450 comprises temperature sensitive fuses 428 and 430, MOV 432 and three-electrode gas discharge tube 436 (previously described). A suitable MOV 432 is made by Harris Semiconductor Corp. and is available under part number V131H40. It has a breakdown voltage of about 200 volts and has a maximum clamping voltage of about 350 volts. Fuses 428 and 430 are located in close physical proximity to MOV 432 and gas tube 436. In the event of an overvoltage condition, MOV will clamp the AC line to a lower voltage. Should MOV 432 fail, gas discharge tube 436 will protect the equipment plugged into outlets 512 by clamping the line to a very low voltage, thereby causing fuses 428 and 430 to open. Although a three-electrode gas discharge tube is shown in FIG. 23, a pair of two-electrode gas tubes connected back-to-back could be used and are equivalent to a three electrode gas tube for this application.

Figure 24:
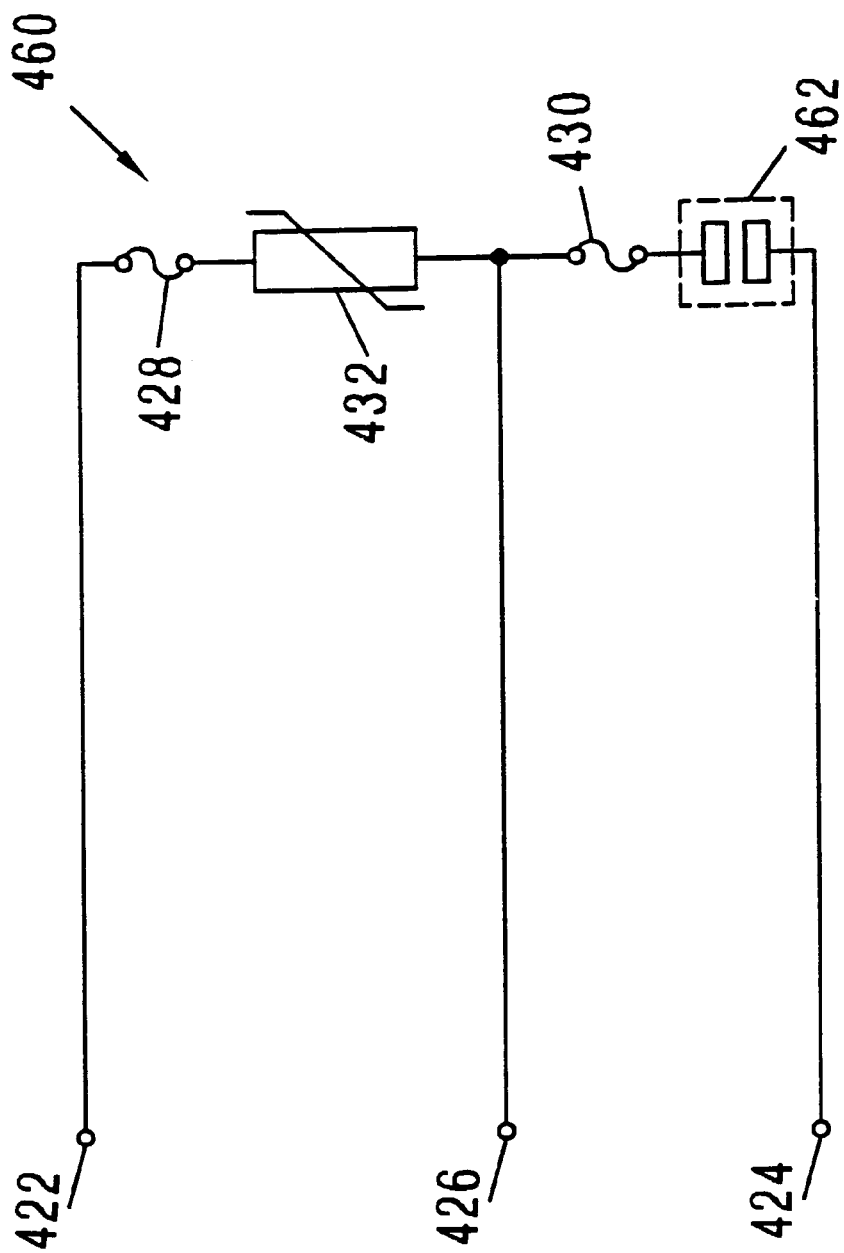
FIG. 24 is a schematic diagram of an alternative AC protection module for use in the plug-in surge suppressor of FIG. 22.

FIG. 24 is a schematic diagram showing an alternative AC overvoltage protection circuit 460. In FIG. 24 the AC power line is connected at 422, the AC neutral at 426 and the ground at 424. Circuit 460 has a temperature sensing fuse 428 connected in series with MOV 432 and a temperature sensing fuse 430 connected in series with a two-electrode gas discharge tube 462. In lieu of a two-electrode gas tube a three-electrode gas tube could be used, with two of the electrodes connected together. In FIG. 24 fuse 428 is located in close physical proximity to MOV 432 and fuse 430 is located in close physical proximity to gas discharge tube 462. Fuses 428 and 430 in FIG. 24 are the same as fuses 428 and 430 in FIG. 23 while gas discharge tube 462 may be a TII 44 tube made by TII Industries, Inc., Copiague, N.Y. and having a breakdown voltage between about 300 and about 500 volts.

Figure 25:
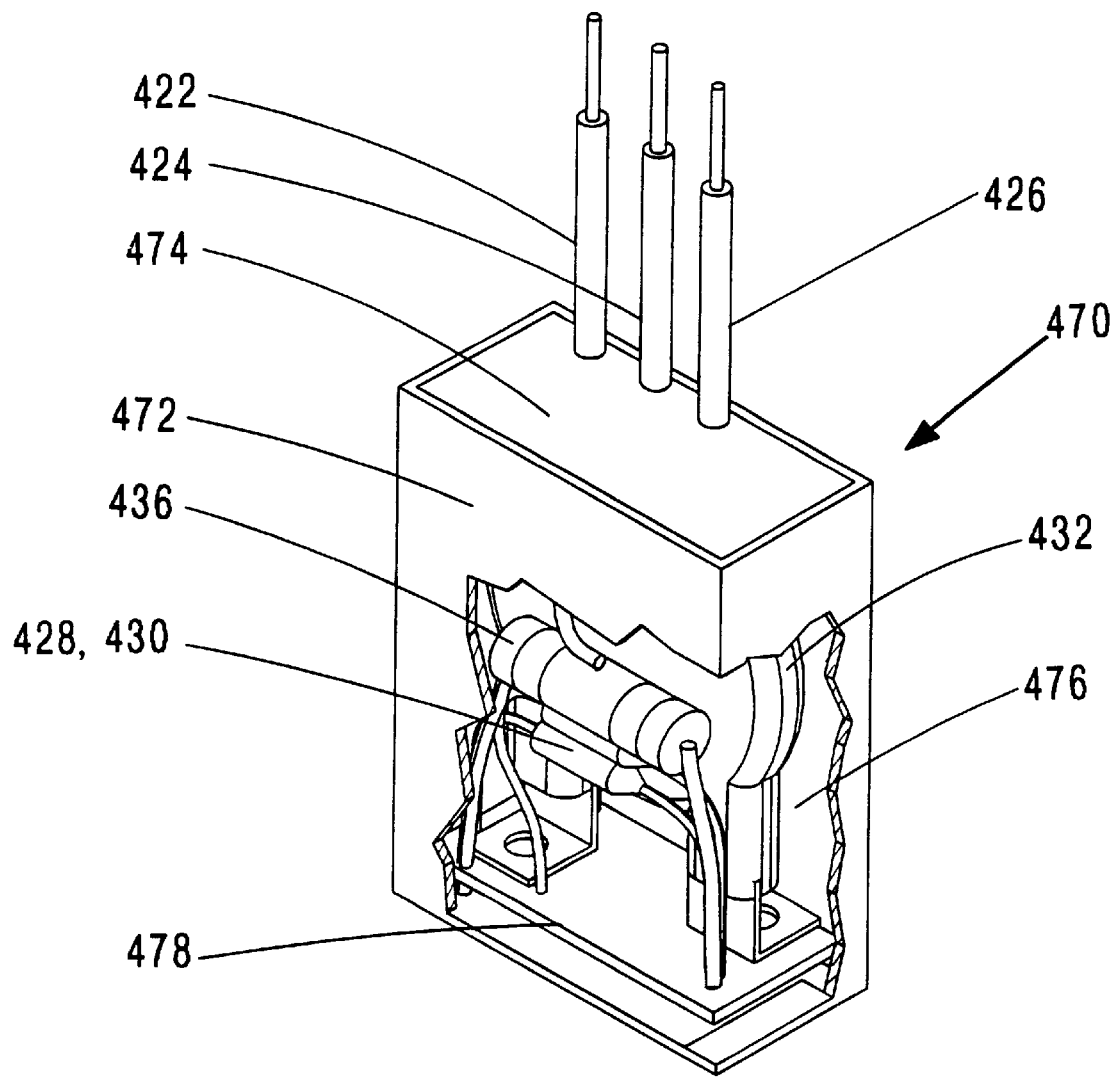
FIG. 25 is a perspective drawing, partially cut away, of the AC protection module shown in FIGS. 23 and 24.

FIG. 25 is a perspective drawing, partially cut away, showing how the AC overvoltage protection circuits shown schematically in FIGS. 23 and 24. FIG. 25 shows a module 470 having conductors 422, 424 and 426 which are adapted to be connected, respectively, to the AC line, ground and the AC neutral. Located within enclosure 472 are MOV 432, three electrode gas discharge tube 436 and temperature sensing fuses 428, 430. The enclosure is preferably filled with electrical grade silica sand 476. The enclosure is sealed with epoxy 474. Components are mounted on a printed circuit board 478.

While the present invention has been described by reference to various preferred embodiments, it will be understood by persons skilled in the art that many modifications and variations may be made in those preferred embodiments without departing from the spirit and scope of the present invention. Accordingly, it is intended that the invention not be limited to the disclosed preferred embodiments, but that it have the full scope permitted by the following claims.

What is claimed is:

1. Residential protection service center apparatus comprising:
    (a) an enclosure;
    (b) an AC overvoltage protection circuit located within the enclosure for protecting AC power lines from overvoltage conditions, the AC overvoltage protection circuit having at least three conductors, a first conductor adapted to be connected to a first AC power line, a second conductor adapted to be connected to a second AC power line and a third conductor adapted to be connected to AC neutral, the circuit further comprising
        (1) a first temperature sensing fuse connected in series with the first conductor,
        (2) a second temperature sensing fuse connected in series with the second conductor,
        (3) a three-electrode gas discharge tube, the first electrode being connected to AC neutral,
        (4) a first MOV connected between the first fuse and the second electrode of the gas tube, and
        (5) a second MOV connected between the second fuse and the third electrode of the gas tube, wherein the first and second fuses are located in close physical proximity to the gas tube and the MOVs.

2. The apparatus of claim 1 further comprising an indicator associated with each AC line to provide an indication of the presence or absence of overvoltage protection.

3. The apparatus of claim 1 further comprising a first overvoltage and overcurrent protection circuit located within the enclosure and adapted to be connected in series with a telephone voice line and to a common ground for protecting the telephone voice line from overvoltage and overcurrent conditions.

4. The apparatus of claim 1 further comprising second and third overvoltage and overcurrent protection circuits located within the enclosure and adapted to be connected in series with a high speed data line and to a common ground for protecting the high speed data line from overvoltage and overcurrent conditions.

5. The apparatus of claim 1 further comprising a coaxial surge arrestor located within the enclosure and adapted to be connected in series with a coaxial transmission line and to a common ground for protecting the coaxial transmission line from overvoltage conditions.

6. The apparatus of claim 1 further comprising:
    (a) an overvoltage and overcurrent protection circuit located within the enclosure and adapted to be connected in series with a telephone voice line and to a common ground for protecting the telephone voice line from overvoltage and overcurrent conditions; and
    (b) a coaxial surge arrestor located within the enclosure and adapted to be connected in series with a coaxial transmission line and to the common ground for protecting the coaxial transmission line from overvoltage conditions.

7. Residential protection service center apparatus adapted to be located within a residence comprising:
  (a) an enclosure;
  (b) an AC overvoltage protection circuit located within the enclosure for protecting AC power lines from overvoltage conditions, the AC overvoltage protection circuit having at least three conductors, a first conductor being adapted to be connected to a first AC power line, a second conductor being adapted to be connected to a second AC power line and a third conductor being adapted to be connected to AC neutral, the AC overvoltage protection circuit further comprising
    (1) a first temperature sensing fuse connected in series with the first conductor,
    (2) a second temperature sensing fuse connected in series with the second conductor,
    (3) a three-electrode gas discharge tube, the first electrode being connected to AC neutral,
    (4) a first MOV connected between the first fuse and the second electrode of the gas tube, and
    (5) a second MOV connected between the second fuse and the third electrode of the gas tube, wherein the first and second fuses are located in close physical proximity to the gas tube and the MOVs;
  (c) a first overvoltage and overcurrent protection circuit located within the enclosure and adapted to be connected in series with a telephone voice line and to a common ground for protecting the telephone voice line from overvoltage and overcurrent conditions;
  (d) second and third overvoltage and overcurrent protection circuits located within the enclosure and adapted to be connected in series with a high speed data line and to the common ground for protecting the high speed data line from overvoltage and overcurrent conditions; and
  (e) a coaxial surge arrestor located within the enclosure and adapted to be connected in series with a coaxial transmission line and to the common ground for protecting the coaxial transmission line from overvoltage conditions.

8. The apparatus of claim 7 further comprising:
  (a) first and second RJ-type connectors adapted to be connected to the telephone voice line and wherein the first overvoltage and overcurrent protection circuit which protects the telephone voice line is connected between the first and second RJ-type connectors; and
  (b) third and fourth RJ-type connectors adapted to be connected to the high speed data line and wherein the second and third overvoltage and overcurrent protection circuits which protect the high speed data line are connected between the third and fourth RJ-type connectors.

9. Residential protection service center apparatus adapted to be located within a residence comprising:
  (a) an enclosure;
  (b) an AC overvoltage protection circuit for protecting AC power lines from overvoltage conditions, the AC overvoltage protection circuit having at least three conductors, a first conductor being adapted to be connected to a first AC power line, a second conductor being adapted to be connected to a second AC power line and a third conductor being adapted to be connected to the AC neutral, the AC overvoltage protection circuit further comprising
    (1) a first temperature sensing fuse connected in series with the first conductor,
    (2) a second temperature sensing fuse connected in series with the second conductor,
    (3) a three-electrode gas discharge tube, the first electrode being connected to AC neutral,
    (4) a first MOV connected between the first fuse and the second electrode of the gas tube, and
    (5) a second MOV connected between the second fuse and the third electrode of the gas tube, wherein the first and second fuses are located in close physical proximity to the gas tube and the MOVs; and
  (c) an uninterruptible power supply having at least two conductors, one conductor being adapted to be connected to an AC power line and one conductor being adapted to be connected to the AC neutral.

10. Residential protection service center apparatus adapted to be located within a residence and comprising:
  (a) an AC overvoltage protection circuit for protecting AC power lines from overvoltage conditions, the AC overvoltage protection circuit having at least three conductors, a first conductor being adapted to be connected to a first AC power line, a second conductor being adapted to be connected to a second AC power line and a third conductor being adapted to be connected to AC neutral, the AC overvoltage protection circuit further comprising
    (1) a first temperature sensing fuse connected in series with the first conductor,
    (2) a second temperature sensing fuse connected in series with the second conductor,
    (3) a three-electrode gas discharge tube, the first electrode being connected to AC neutral,
    (4) a first MOV connected between the first fuse and the second electrode of the gas tube, and
    (5) a second MOV connected between the second fuse and the third electrode of the gas tube, wherein the first and second fuses are located in close physical proximity to the gas tube and the MOVs;
  (b) an overvoltage and overcurrent protection circuit adapted to be connected in series with a telephone voice line and to a common ground for protecting the telephone voice line from overvoltage and overcurrent conditions;
  (c) an RF amplifier having an input and an output; and
  (d) a coaxial surge arrestor connected in series with the input of the RF amplifier and to the common ground and adapted to be connected to an external coaxial transmission line for protecting the external coaxial transmission line from overvoltage conditions.

11. The apparatus of claim 10 further comprising second and third overvoltage and overcurrent protection circuits adapted to be connected in series with a high speed data line and to the common ground for protecting the high speed data line from overvoltage and overcurrent conditions.

12. The apparatus of claim 11 further comprising:
  (a) first and second RJ-type connectors adapted to be connected to the telephone voice line and wherein the overvoltage and overcurrent protection circuit which protects the telephone voice line is connected between the first and second RJ-type connectors; and
  (b) third and fourth RJ-type connectors adapted to be connected to the high speed data line and wherein the second and third overvoltage and overcurrent protection circuits which protect the high speed data line are connected between the third and fourth RJ-type connectors.

13. The apparatus according to claim 10 further comprising a block converter having an input and an output, the input being adapted to be connected to a router and the output being adapted to be connected to an internal coaxial transmission line.

14. The apparatus of claim 13 further comprising at least one coaxial splitter connected to the output of the block converter for splitting one incoming coaxial transmission line into a plurality of outgoing coaxial transmission lines.

15. The apparatus of claim 10 further comprising at least one coaxial splitter connected to the output of the RF amplifier for splitting one incoming coaxial transmission line into a plurality of outgoing coaxial transmission lines.

16. The apparatus of claim 10 further comprising a module adapted to be connected in series with the telephone voice line, the module containing the overvoltage and overcurrent protection circuit for the telephone voice line and at least three RJ-type of connectors for splitting an input telephone voice line into a plurality of output telephone voice lines.

17. The apparatus of claim 10 further comprising a module adapted to be connected in series with a high speed data line, the module containing second and third overvoltage and overcurrent protection circuits for the high speed data line and at least three RJ-type connectors for splitting an input high speed data line into a plurality of output high speed data lines.

18. Residential protection service center comprising:
(a) an AC overvoltage protection circuit for protecting AC power lines from overvoltage conditions, the AC overvoltage protection circuit having at least three conductors, a first conductor being adapted to be connected to a first AC power line, a second conductor being adapted to be connected to a second AC power line and a third conductor being adapted to be connected to the AC neutral, the AC overvoltage protection circuit further comprising
(1) a first temperature sensing fuse connected in series with the first conductor,
(2) a second temperature sensing fuse connected in series with the second conductor,
(3) a three-electrode gas discharge tube, the first electrode being connected to AC neutral,
(4) a first MOV connected between the first fuse and the second electrode of the gas tube, and
(5) a second MOV connected between the second fuse and the third electrode of the gas tube, wherein the first and second fuses are located in close physical proximity to the gas tube and the MOVs;
(b) an uninterruptible power supply having at least two conductors, one conductor being adapted to be connected to an AC power line and one conductor being adapted to be connected to the AC neutral;
(c) an overvoltage and overcurrent protection circuit adapted to be connected in series with a telephone voice line and to a common ground for protecting the telephone voice line from overvoltage and overcurrent conditions; and
(d) a coaxial surge arrestor connected in series with an RF amplifier and to the common ground and adapted to be connected to an external coaxial transmission line for protecting the external coaxial transmission line from overvoltage conditions.

19. The apparatus of claim 18 further comprising second and third overvoltage and overcurrent protection circuits adapted to be connected in series with a high speed data line and to the common ground for protecting the high speed data line from overvoltage and overcurrent conditions.

20. The apparatus of claim 19 further comprising:
(a) first and second RJ-type connectors adapted to be connected to the telephone voice line and wherein the overvoltage and overcurrent protection circuit which protects the telephone voice line is connected between the first and second RJ-type connectors; and
(b) third and fourth RJ-type connectors adapted to be connected to the high speed data line and wherein the second and third overvoltage and overcurrent protection circuits which protect the high speed data line are connected between the third and fourth RJ-type connectors.

21. The apparatus of claim 18 further comprising the RF amplifier having an input and an output and at least one coaxial splitter connected to the output of the RF amplifier for splitting one incoming coaxial transmission line into a plurality of outgoing coaxial transmission lines.

22. The apparatus of claim 18 further comprising a block converter having an input and an output and at least one coaxial splitter connected to the output of the block converter for splitting one incoming coaxial transmission line into a plurality of outgoing coaxial transmission lines.

23. The apparatus of claim 18 further comprising a module adapted to be connected in series with the telephone voice line, the module containing the overvoltage and overcurrent protection for the telephone voice line and at least three RJ-type connectors for splitting an input telephone voice line into a plurality of output telephone voice lines.

24. The apparatus of claim 18 further comprising a module adapted to be connected in series with a high speed data line, the module containing second and third overvoltage and overcurrent protection circuits for the high speed data line and at least three RJ-type connectors for splitting an input high speed data line into a plurality of output high speed data lines.

25. The apparatus of any of claims 5, 7, 10 or 18, wherein the coaxial surge arrestor comprises:
(a) a hollow conductive housing;
(b) insulating ends adapted to seal the housing;
(c) an inert gas sealed in the housing;
(d) a conductor extending through the housing, the conductor having a longitudinal axis oriented in a direction parallel to the direction of signal transmission; and
(e) the diameter of the conductor being varied along at least a portion of the length of the conductor within the housing for matching the impedance of the surge arrestor to that of the coaxial cables.

26. The apparatus of any of claims 4, 7, 12 or 19 wherein both the second overvoltage and overcurrent protection circuit and the third overvoltage and overcurrent protection circuit comprises a gas discharge tube and a diode bridge with an avalanche diode connected across the diode bridge.

27. The apparatus of any of claims 3, 7, 10 or 18 wherein the overvoltage and overcurrent protection circuit which protects the telephone voice line from overvoltage and overcurrent conditions comprises:
(a) a first fuse, a first resistor and a first MOV connected in series between a first input telephone line conductor and the common ground, a first output telephone line conductor being connected between the first resistor and the first MOV; and
(b) a second fuse, a second resistor and a second MOV connected in series between a second input telephone line conductor and the common ground, a second output telephone line conductor being connected between the second resistor and the second MOV.

28. The apparatus of any of claims 3, 7, 10 or 18 wherein the overvoltage and overcurrent protection circuit which protects the telephone voice line from overvoltage and overcurrent conditions comprises:

(a) a first fuse and a first resistor connected in series, the first fuse being connected to a first input telephone line conductor;

(b) a second fuse and a second resistor connected in series, the second fuse being connected to a second input telephone line conductor; and (c) a three-electrode gas discharge tube, the first electrode being connected to the first resistor, the second electrode being connected to the second resistor and the third electrode being connected to the common ground, a first output telephone line conductor being connected to the first electrode and a second output telephone line conductor being connected to the second electrode.

* * * * *